(12) United States Patent
Kline et al.

(10) Patent No.: US 7,921,643 B2
(45) Date of Patent: Apr. 12, 2011

(54) HYDROSTATIC TRANSAXLE

(75) Inventors: Zachary D. Kline, Morristown, TN (US); Katsumoto Mizukawa, Morristown, TN (US)

(73) Assignee: Kanzaki Kokyukoki Mfg. Co., Ltd., Hyogo (JP)

( * ) Notice: Subject to any disclaimer, the term of this patent is extended or adjusted under 35 U.S.C. 154(b) by 558 days.

(21) Appl. No.: 12/013,173

(22) Filed: Jan. 11, 2008

(65) Prior Publication Data

US 2009/0178401 A1    Jul. 16, 2009

(51) Int. Cl.
*F16D 31/02* (2006.01)
(52) U.S. Cl. .......................................... 60/487
(58) Field of Classification Search .............. 60/487
See application file for complete search history.

(56) References Cited

U.S. PATENT DOCUMENTS

| | | | |
|---|---|---|---|
| 5,156,576 A | | 10/1992 | Johnson |
| 5,447,028 A | * | 9/1995 | Azuma et al. ............. 60/487 |
| 6,390,227 B1 | | 5/2002 | Abend et al. |
| 6,397,594 B2 | | 6/2002 | Hauser et al. |
| 6,457,546 B1 | * | 10/2002 | Ishimaru et al. ............. 60/487 |
| 7,043,908 B2 | | 5/2006 | Irikura et al. |

OTHER PUBLICATIONS

European Search Report for European Application No. EP 08 02 0694, dated Nov. 15, 2010, 4 pgs.

* cited by examiner

*Primary Examiner* — Michael Leslie
(74) *Attorney, Agent, or Firm* — Sterne, Kessler, Goldstein & Fox P.L.L.C.

(57) ABSTRACT

A hydrostatic transaxle (IHT) comprises a hydrostatic transmission (HST), an axle, a deceleration drive train, a first housing member, and a second housing member. The HST includes first and second hydraulic displacement units fluidly connected to each other. The first hydraulic displacement unit has a pump shaft for receiving power from a prime mover. The second hydraulic displacement has a motor shaft. The deceleration drive train is interposed between the motor shaft and the axle. The first housing member supports the HST and the deceleration drive train, and has an opening through which the HST and the deceleration drive train are installed into the first housing member. The second housing member is joined to the first housing member so as to serve as a lid for covering the opening of the first housing member after the HST and the deceleration drive train are installed in the first housing member so as to be supported by the first housing member.

16 Claims, 23 Drawing Sheets

HYDROSTATIC TRANSAXLE

BACKGROUND OF THE INVENTION

1. Field of the Invention

The present invention relates to a hydrostatic transaxle (hereinafter referred to as an "integrated hydrostatic transaxle" or as "IHT") in which a common housing incorporates a hydrostatic transmission (hereinafter referred to as "HST"), an axle, and a deceleration drive train interposed between the HST and the axle, wherein the HST includes a hydraulic pump and a hydraulic motor fluidly connected to the hydraulic pump.

The present invention also relates to a center section for mutually fluidly connecting a hydraulic pump and a hydraulic motor so as to constitute an HST which is adaptable to the IHT.

2. Related Art

As disclosed in U.S. Pat. Nos. 5,156,576; 6,390,227; 6,397,594; and 7,043,908 (hereinafter referred to as references '576, '227, '594 and '908), there is a well-known IHT in which a common housing incorporates a HST, an axle, and a deceleration drive train interposed between the HST and the axle. The HST includes a pair of hydraulic displacement units serving as a hydraulic pump and a hydraulic motor. The HST also includes a center section. A pump cylinder block of the hydraulic pump and a motor cylinder block of the hydraulic motor are mounted on the center section so as to fluidly connect the hydraulic pump and motor to each other through fluid passages formed in the center section.

In the conventional IHT, the housing includes two distinct housing members separably joined to each other. For example, as disclosed in references '576, '227 and '908, the two housing members are upper and lower housing members joined to each other through a horizontal joint surface. Otherwise, as disclosed in reference '594, the housing members are left and right housing members joined to each other through a vertical joint surface.

Conventionally, both of the housing members cooperatively support the HST and the deceleration drive train. In this regard, with respect to the IHT including the upper and lower housing members, as disclosed in references '576, '227 and '908, a motor shaft of the hydraulic motor is disposed so as to have a center axis thereof on the joint surface between the upper and lower housing members, thereby being supported by the upper and lower housing members. During rotation of the motor shaft, both the upper and lower housing members are loaded with the thrust or radial force generated from the motor shaft. Further, a retainer of a swash plate (a thrust bearing) of the hydraulic motor is sandwiched between the two housing members, i.e., supported by the two housing members. The thrust forces of pistons fitted in the motor cylinder block against the swash plate are transmitted to both of the housing members through the retainer. Further, as disclosed in references '227 and '908, an intermediate (counter) shaft of the deceleration drive train is disposed so as to have a center axis thereof on the joint surface between the two housing members, thereby being supported by the two housing members so that both the housing members are loaded with radial or thrust force caused by rotation of the intermediate shaft.

With respect to the IHT including the left and right housing members, as disclosed in reference '594, a motor shaft of the hydraulic motor is supported at a first end thereof by one of the left or right housing members. The other of the left or right housing members supports a thrust bearing serving as a swash plate against which pistons fitted in a motor cylinder block abut, and a second end of the motor shaft is disposed in the motor cylinder block. Thus, the HST is supported by both the left and right housing members. Further, an intermediate shaft of the deceleration drive train is supported at opposite ends thereof by the respective left and right housing members. As a result, both the left and right housing members are loaded by the HST and the deceleration drive train.

To economize the housing, it is suggested that one of the housing members is made of an inexpensive material, such as a plastic or a synthetic resin. However, in the conventional IHT mentioned above, both of the housing members must support the HST and the deceleration drive train. In other words, both of the housing members are loaded by the HST and the deceleration drive train. Ideally, housing members to be made of inexpensive material should be free from such loads.

In addition, to compact the IHT, narrowing the center section is desirable. Further, if the hydraulic pump is variable in displacement, disposing a pump control arm and its complex surrounding mechanism (which are exposed on an outside surface of the housing) in a dead space is desirable in that it prevents this structure from interfering with another external mechanism.

In this regard, as disclosed in references '227 and '594, the center section is suggested to have a narrow portion offset from its pump mounting portion, so as to support the motor shaft and the motor cylinder block. The motor cylinder block is provided on one end portion of the motor shaft on a first side of the center section, and a motor gear constituting the deceleration drive train is provided on the other end portion of the motor shaft on a second side of the center section opposite to the first side. However, the pump control arm is disposed on the second side of the center section adjacent to the motor gear. The portion of the housing on the second side of the center section occupies a large space for containing gears or elements of the deceleration drive train, thereby hindering the pump control arm from being compactly arranged.

Further, to economize the center section, simplification of boring the fluid passages in the center section is desirable. Conventionally, the fluid passages formed in the center section to be interposed between the pump cylinder block and the motor cylinder block include holes bored to connect pump kidney ports to motor kidney ports, thereby complicating the machining process.

SUMMARY OF THE INVENTION

A first object of the invention is to provide an IHT having an ability of economizing a housing structure.

To achieve the first object, a hydrostatic transaxle (IHT) according to the invention comprises a hydrostatic transmission (HST), an axle, a deceleration drive train, a first housing member, and a second housing member. The HST includes first and second hydraulic displacement units fluidly connected to each other. The first hydraulic displacement unit has a pump shaft for receiving power from a prime mover. The second hydraulic displacement unit has a motor shaft. The deceleration drive train is interposed between the motor shaft and the axle. The first housing member supports the HST and the deceleration drive train, and has an opening through which the HST and the deceleration drive train are installed into the first housing member. The second housing member is joined to the first housing member so as to serve as a lid for covering the opening of the first housing member after the HST and the deceleration drive train are installed in the first housing member so as to be supported by the first housing member.

Therefore, the second housing member serving as the lid, which is free from the load by the HST and the deceleration drive train, can be made of inexpensive material such as plastic or synthetic resin so as to economize the IHT.

Preferably, the second hydraulic displacement unit includes: a cylinder block engaging with the motor shaft; a reciprocated axial piston provided in the cylinder block; a swash plate abutting against a head of the piston; and a retainer for retaining the swash plate. Of the first and second housing members, only the first housing member supports the retainer.

Therefore, the second housing member serving as the lid, which is free from the load by the HST (especially the swash plate of the second hydraulic displacement unit) and the deceleration drive train, can be made of inexpensive material such as plastic or synthetic resin so as to economize the IHT.

Preferably, of the first and second housing members, only the first housing member supports the motor shaft.

Therefore, the second housing member serving as the lid, which is free from the load by the HST (especially the motor shaft of the second hydraulic displacement unit) and the deceleration drive train, can be made of inexpensive material such as plastic or synthetic resin so as to economize the IHT.

Preferably, the deceleration drive train includes an intermediate shaft. Of the first and second housing members, only the first housing member supports the intermediate shaft.

Therefore, the second housing member serving as the lid, which is free from the load by the deceleration drive train (especially the intermediate shaft) and the HST, can be made of inexpensive material such as plastic or synthetic resin so as to economize the IHT.

Preferably, the first and second housing members cooperatively support the axle, so that, during rotation of the axles, the second housing member receives only a component of a centrifugal force of the rotating axle substantially perpendicular to a joint surface between the first and second housing members.

Therefore, the second housing member is free from the component of the centrifugal force of the rotating axle parallel to the joint surface of the first and second housing members causing deviation of the second housing member from the first housing member. For example, when the first and second housing members are vertically joined to each other through a horizontal joint surface, the second housing member is subject only to vertical components of centrifugal forces of the rotating axle but not to horizontal components of centrifugal forces of the rotating axle, such that the second housing member is prevented from horizontally deviating from the first housing member during rotation of the axle. As a result, the second housing member can be made of inexpensive material such as plastic or synthetic resin so as to economize the IHT.

In an alternative preference, of the first and second housing members, only the first housing member supports the axle.

Therefore, the second housing member serving as the lid which is free from the load by the axle, and the HST can be made of inexpensive material such as plastic or synthetic resin so as to economize the IHT.

Preferably, the first and second housing members are joined to each other separably along a joint surface disposed in parallel to a phantom surface including an axis of the axle.

Therefore, the first and second housing members can be easily divided or joined while the axle is supported by only one of the first and second housing members, intersecting the phantom surface including the axis of the axle. If only the first housing member supports the axle, the second housing member serving as the lid which is further free from the load by the axle and the HST can be made of inexpensive material such as plastic or synthetic resin so as to economize the IHT.

A second object of the invention is to provide a compact IHT.

To achieve the second object, an IHT according to the invention comprises: a variable displacement hydraulic pump including a pump cylinder block and a pump shaft for receiving power from a prime mover; a hydraulic motor including a motor cylinder block and a motor shaft; a center section on which the pump cylinder block and the motor cylinder block are mounted so as to fluidly connect the hydraulic pump and motor to each other; an axle; a deceleration drive train interposed between the motor shaft and the axle, the deceleration drive train including a motor gear provided on the motor shaft, wherein the motor cylinder block and the motor gear are disposed opposite to each other with respect to the center section; and a pump control arm for controlling the displacement of the hydraulic pump, wherein the pump control arm and the motor gear are disposed on opposite sides of the center section.

Therefore, the pump control arm is compactly disposed in a dead space adjacent to the motor cylinder block opposite to the motor gear with respect to the center section, thereby compacting the IHT. Further, the center section disposed between the motor cylinder block and the motor gear prevents metal particles generated by friction of gears of the deceleration drive train, including the motor gear, from influencing the motor cylinder block.

Preferably, the IHT further comprises a support member disposed adjacent to the center section. The center section and the support member support the motor shaft.

Therefore, the portion of the center section between the motor gear and the motor cylinder block can be narrowed so as to miniaturize and economize the center section, thereby economizing the IHT. Further, the support member supporting the motor shaft occupies a free space created by the narrowing of a portion of the center section, and it can be made inexpensively in comparison with the center section.

A third object of the invention is to provide a center section for accommodating a compact HST (or IHT).

To achieve the third object, a center section comprises: a pump mounting surface adapted to have a pump cylinder block mounted thereon; a motor mounting surface adapted to have a motor cylinder block mounted thereon; a pair of pump kidney ports opened at the pump mounting surface; and a pair of motor kidney ports opened at the motor mounting surface connected to the respective pump kidney ports. The motor mounting surface is disposed relative to the pump mounting surface so that one of the motor kidney ports is disposed just below the pump mounting surface when the pump mounting surface is viewed in plan.

Therefore, at least one of the motor kidney ports is disposed close to the pump kidney port, thereby compacting the center section, and thereby facilitating the forming of a fluid passage in the center section so as to fluidly connect the pump cylinder block and the motor cylinder block mounted on the center section. To form the fluid passage optimized in compactness, simplification and economization, the fluid passage can be constituted by only the pump kidney port and motor kidney port.

Preferably, the center section supports a pump shaft engaging with the pump cylinder block mounted on the pump mounting surface and a motor shaft engaging with the motor cylinder block mounted on the motor mounting surface so that an extension axial line of the pump shaft does not intersect an extension axial line of the motor shaft.

Therefore, the pump shaft and the motor shaft are disposed close to each other so as to compact the HST while they are prevented from interfering with each other.

Preferably, the motor kidney ports are extended in parallel to the motor shaft so as to intersect the respective pump kidney ports.

Therefore, the motor kidney ports are directly connected to the respective pump kidney ports so as to constitute simple fluid passages interposed between the pump and motor cylinder blocks mounted on the center section, thereby reducing the number of processes for boring holes in the center section, and economizing the center section.

Further preferably, when viewed facing the motor mounting surface, the pair of motor kidney ports are aligned on a line connecting the center of the motor mounting surface to the pump mounting surface, which is diagonal with respect to the pump mounting surface.

Therefore, by machining or the like, the motor kidney ports can be efficiently bored in the center section to be connected to the respective pump kidney ports.

Preferably, the center section is provided therein with a valve for expanding a neutral zone of a hydraulic pump including the pump cylinder block. The valve is offset from the pump shaft.

Therefore, the valve can be compactly disposed in the center section even if it is disposed axially perpendicular to the pump shaft.

Further preferably, the center section is provided therebelow with a plate-shaped filter, wherein a magnet is provided on an edge of the filter.

Therefore, the plate-shaped filter is compactly provided on the center section so as to compact the HST or IHT. The magnet provided on the plate-shaped filter also serves as a filter for adsorbing metallic particles caused by friction of gears in the IHT. Thus, the filter assembly can have filters collected at the bottom portion of the center section.

These, and other further objects, features and advantages of the invention will appear more fully from the following description with reference to accompanying drawings.

DETAILED DESCRIPTION OF THE INVENTION

Figure 1:
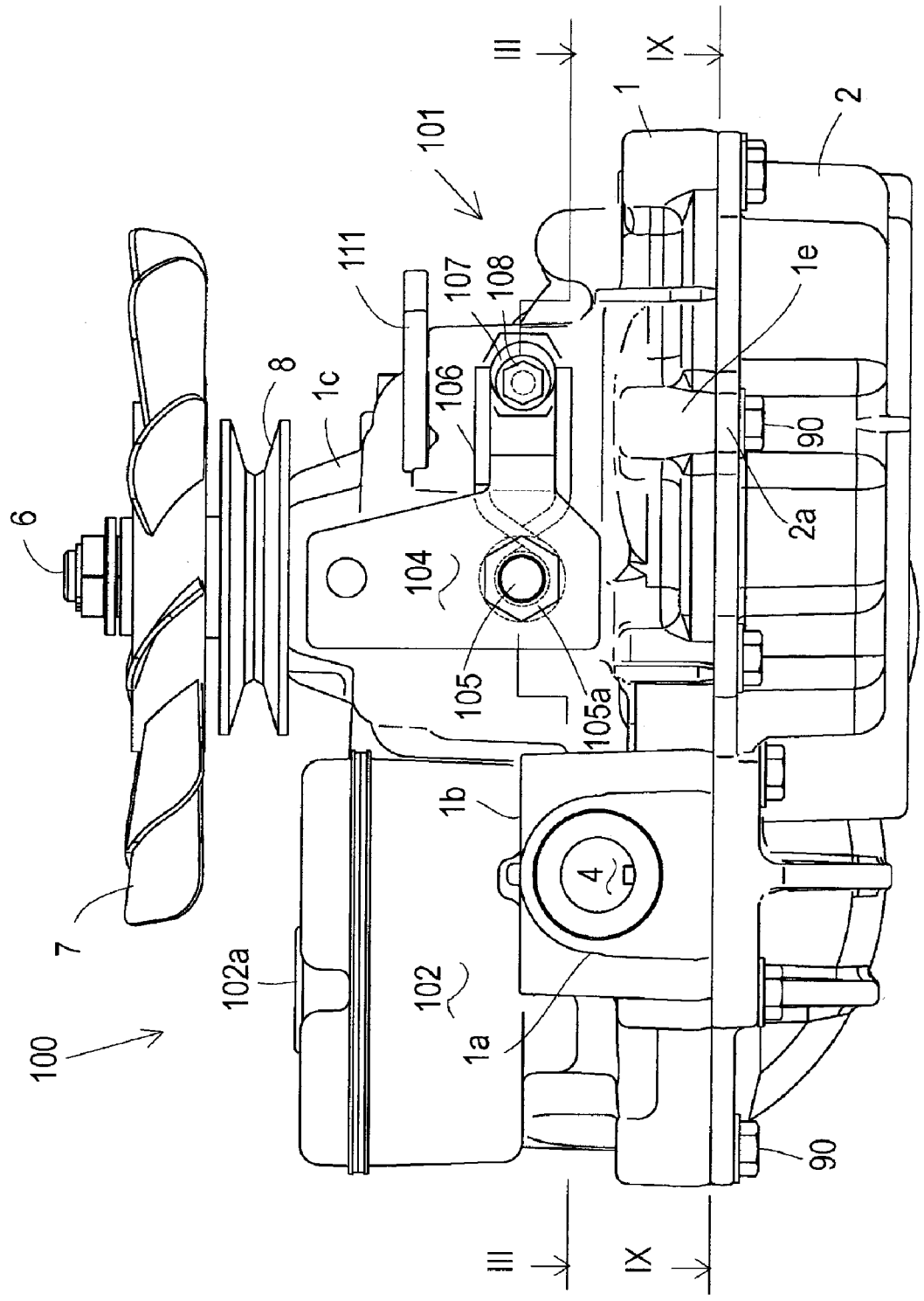
FIG. 1 is a side view of a hydrostatic transaxle (IHT) showing a side thereof with a motor control mechanism.

Referring to FIGS. 3 to 10 and others, a hydrostatic transaxle (IHT) 100 is configured so that a first (upper) housing member 1 and a second (lower) housing member 2 are joined through a horizontal joint surface to constitute a common housing 101, which incorporates a hydrostatic transmission (HST) 3, a pair of left and right axles 4 and a deceleration drive (gear) train 5. HST 3 includes a hydraulic pump P, serving as a first hydraulic displacement unit, and a hydraulic motor M, serving as a second hydraulic displacement unit. Hydraulic pump P and hydraulic motor M are fluidly connected to each other. Hydraulic pump P has a pump shaft 6 for receiving power from a prime mover. Hydraulic motor M has a motor shaft 15 for driving axles 4. Deceleration gear train 5 is interposed between motor shaft 15 and axles 4.

First housing member 1 supports HST 3 and deceleration gear train 5, and has an opening (a bottom opening of upper housing member 1) through which HST 3 and deceleration gear train 5 are installed into first housing member 1. In this regard, when HST 3 and deceleration gear train 5 are installed into first housing member 1, first housing member 1 is turned upside-down and settled so that the opening of first housing member 1 is disposed at the top of overturned first housing member 1. After HST 3 and deceleration gear train 5 are completely installed in first housing member 1 so as to be supported by first housing member 1, second housing member 2 is joined downward to the top edge (i.e., the surrounding edge of the bottom opening) of overturned first housing member 1 so as to serve as a lid for covering the opening of first housing member 1. To separably join second housing member 2 to first housing member 1, bosses 2a formed on the bottom edge of overturned second housing member 2 (the top edge of properly disposed second housing member 2) are placed on respective bosses 1e formed on the top edge of overturned first housing member 1 (the bottom edge of properly disposed first housing member 1), and bolts 90 are screwed into mutually coinciding bosses 2a and 1e so as to fasten second housing member 2 to first housing member 1.

Figure 2:
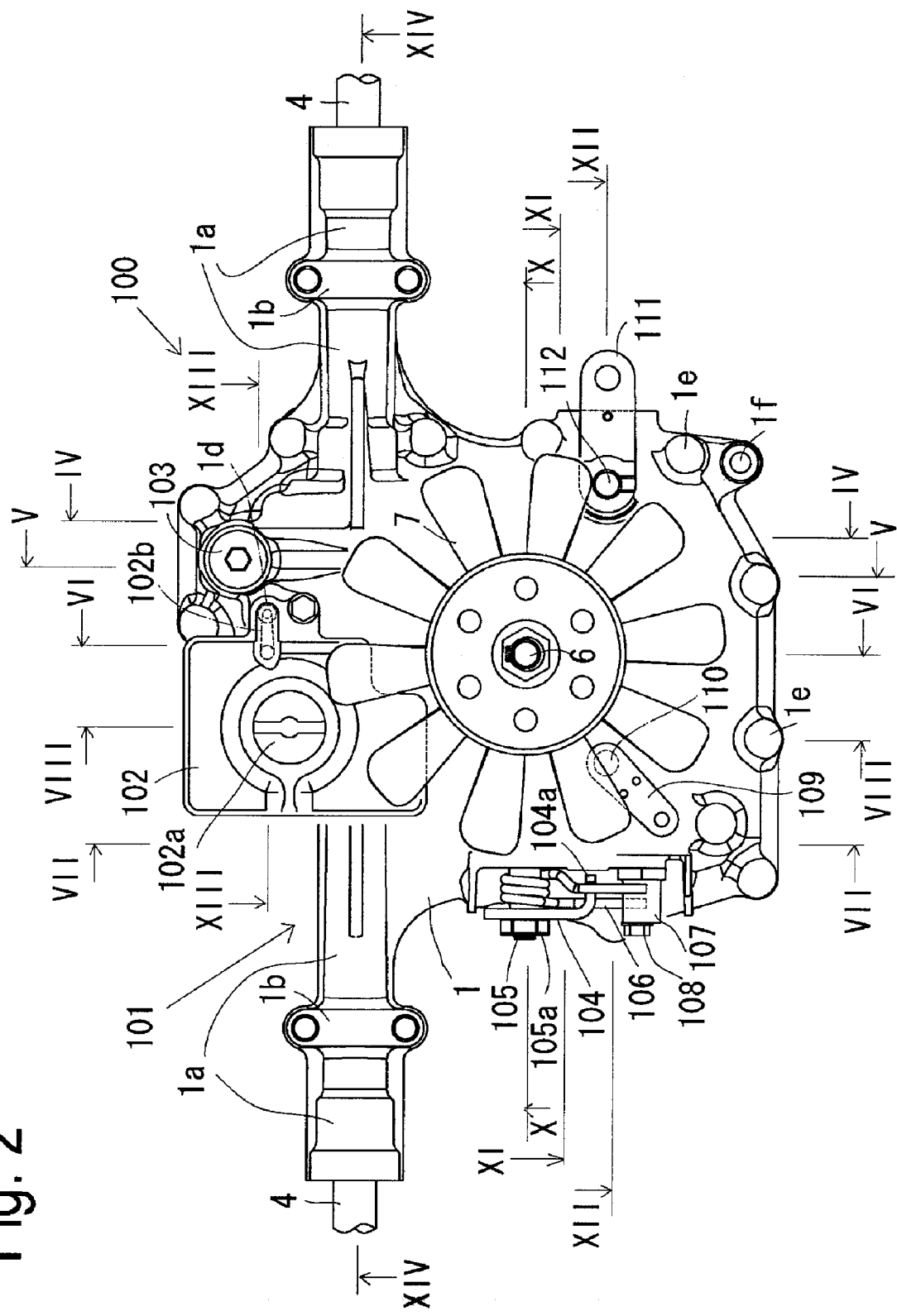
FIG. 2 is a plan view of the IHT.

Incidentally, as shown in FIG. 2, a boss 1f is formed on a portion of the bottom edge of (properly disposed) first housing member 1. Therefore, first housing member 1, i.e., IHT 100, is adapted to be fastened to a vehicle frame (not shown) through boss 1f by a bolt.

After second housing member 2 is completely joined to first housing member 1 (i.e. after housing 101 is completely formed) housing 101 is turned right-side-up, so as to locate first housing member 1 above second housing member 2 so that first housing member 1 serves as the upper housing member, and second housing member 2 serves as the lower housing member. The opening of first housing member 1 is provided as the bottom opening of upper housing member 1.

Due to the above structure of housing 101, first housing member 1 has to be made of material which is strong enough to support HST 3 and deceleration gear train 5. For example, first housing member 1 may be made by casting. On the other hand, the strength of second housing member 2 is not required to be large because it is free from load by HST 3 and deceleration gear train 5. Therefore, second housing member 2 can be made of inexpensive material such as plastic or synthetic resin, thereby reducing manufacturing cost of IHT 100.

Referring to FIGS. 1 and 2 and others, an external structure of IHT 100 will be described. Housing 101 is disposed so that first housing member 1 is disposed above second housing member 2, and the joint surface between first and second housing members 1 and 2 is disposed horizontally. The fore-and-aft direction of IHT 100 is defined as the fore-and-aft direction of a vehicle equipped with IHT 100. Hereinafter, it is assumed that axles 4 are disposed behind HST 3, and the left and right sides are referred to when IHT 101 is viewed in front. First housing member 1 is formed at a rear portion thereof with left and right laterally extended axle housing portions 1a. Left and right horizontal axles 4 are journalled in respective axle housing portions 1a and project laterally outward from distal ends of respective axle housing portions 1a. As shown in FIG. 2, each of axle housing portions 1a is formed on a lateral intermediate portion thereof with a horizontal top flat surface 1b having a pair of front and rear bosses or tapped holes to be fastened to a vehicle frame. Flat surfaces 1b are mainly used to fasten housing 101 of hydrostatic transaxle 100 to the vehicle frame, and boss 1f is used to retain housing 101 against the torque caused by rotation of pump shaft 6.

First housing member 1 is formed at a fore-and-aft center portion thereof with an upwardly extended pump shaft bearing portion 1c. Vertical pump shaft 6 is journalled in pump shaft bearing portion 1c, and projects at the top portion thereof upward from a top end of pump shaft bearing portion 1c so as to be fixedly provided thereon with a cooling fan 7 and an input pulley 8 for receiving power from a prime mover.

Figure 13:
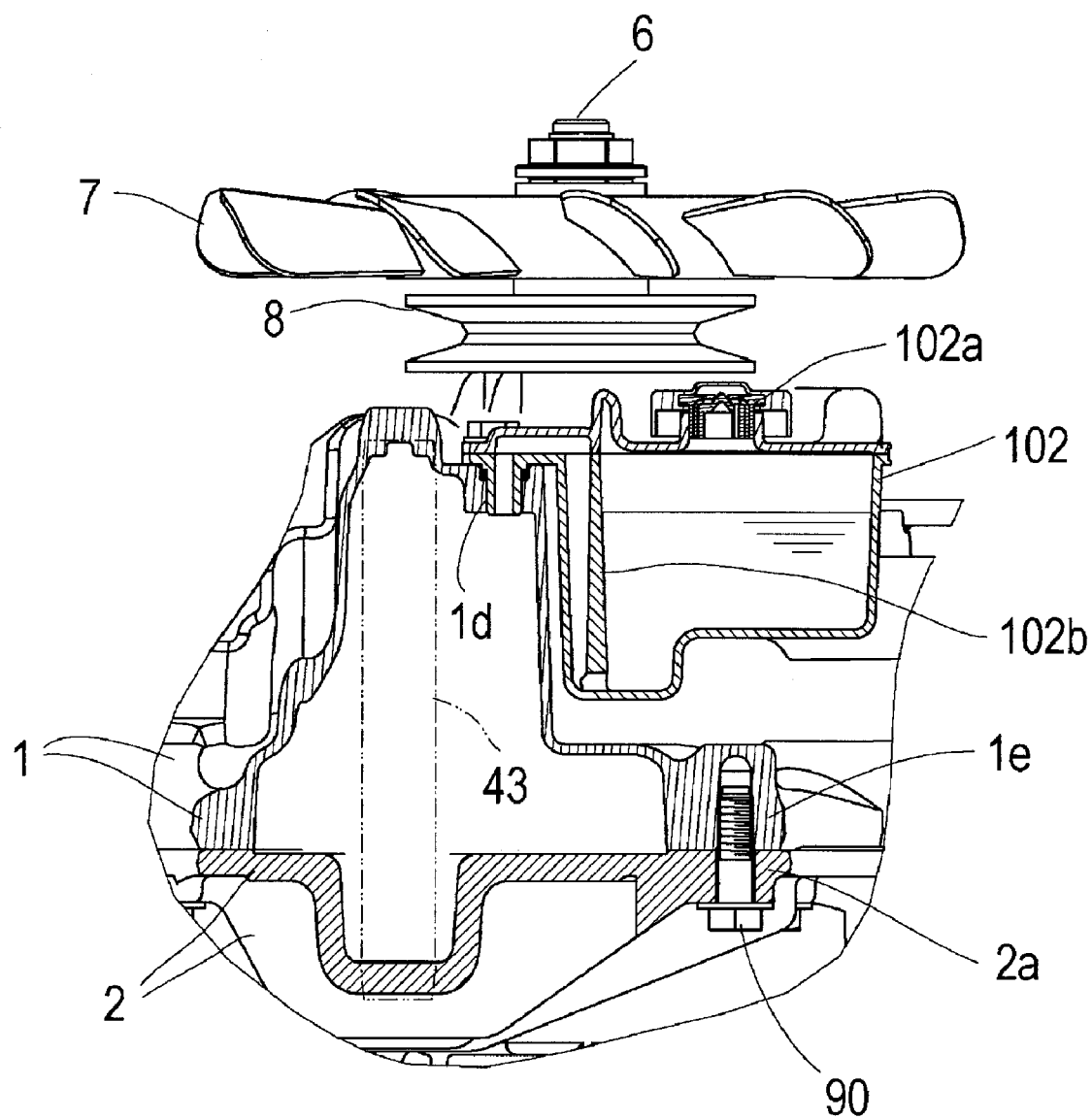
FIG. 13 is a cross sectional view taken along XIII-XIII line of FIG. 2.

An external reservoir tank 102 is supported on an upper rear portion of first housing member 1 below cooling fan 7 fixed on motor shaft 6, so as to absorb volumetrically increased fluid in housing 101 and supply fluid into housing 101, and to be cooled by cooling fan 7. Reservoir tank 102 is provided on a top thereof with a breather cap 102a. Referring to FIG. 13, a siphon duct 102b is integrally formed in reservoir tank 102. A vertical hole 1d is bored in a ceiling wall of first housing member 1, and an end portion of siphon duct 102b is fitted into hole 1d, so as to fluidly communicate the fluid sump in reservoir tank 102 with a fluid sump in housing 101. First housing member 1 is formed with an upwardly opened oiling port at the upper rear portion thereof on one lateral side (in this embodiment, the right side) of reservoir tank 102. As shown in FIG. 2, an oiling cap 103 is provided to close the oiling port.

On one lateral side (in this embodiment, the left side) of pump shaft bearing portion 1c, a pump control mechanism including a pump control arm 104 is provided on a side surface of first housing member 1, and a bypass operation arm 109 is provided on an upper surface of first housing member 1. On the other lateral side (in this embodiment, the right side) of pump shaft bearing portion 1c, a brake arm 111 is provided on the upper surface of first housing member 1. Pump control arm 104 is adapted to be connected to a speed control operation device, such as a lever or a pedal, provided on a vehicle, and brake arm 111 is adapted to be connected to a brake operation device, such as a lever or a pedal, provided on a vehicle.

First housing member 1 pivots a lateral horizontal pump control shaft 105, a vertical bypass operation shaft 110 and a vertical brake shaft 112. Pump control arm 104 is fixed on an outer end of pump control shaft 105, bypass operation arm 109 is fixed on a top end of bypass operation shaft 110, and brake arm 111 is fixed on a top end of brake shaft 112. In the pump control mechanism, a nut 105a is screwed on the outer end of pump control shaft 105 so as to retain pump control arm 104 on pump control shaft 105. An outer portion of pump control shaft 105 is tapered, and a hole of pump control arm 104 for passing pump control shaft 105 is tapered so that the tapered portion of pump control shaft 105 is fitted in the hole of pump control arm 104. Due to the engagement of the tapered portion of pump control shaft 105 in the tapered hole of pump control arm 104, pump control arm 104 can be easily removed from pump control shaft 105 by loosening nut 105a and slightly axially moving pump control arm 104 along pump control shaft 105. A neutral-returning spring 106 is wound around pump control shaft 105 between pump control arm 104 and the vertical side surface of first housing member 1. Pump control arm 104 is partly bent to form a spring-contact portion 104a. Both end portions of neutral-returning spring 106 are twisted to cross each other and are extended to pinch spring-contact portion 104a of pump control arm 104 disposed at its neutral position for realizing the neutral state of hydraulic pump P.

Figure 3:
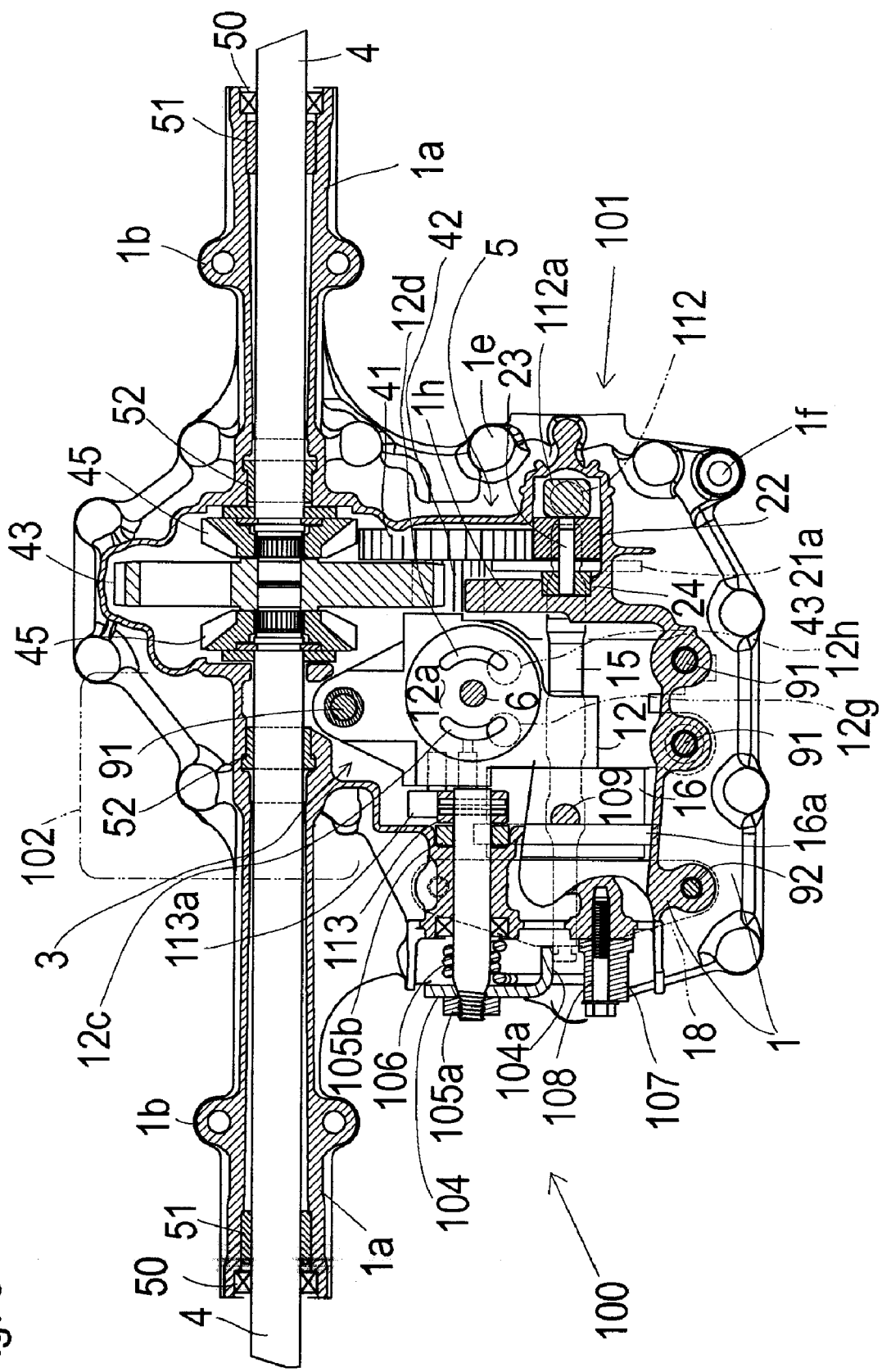
FIG. 3 is a cross sectional view taken along III-III line of FIG. 1.
Figure 4:
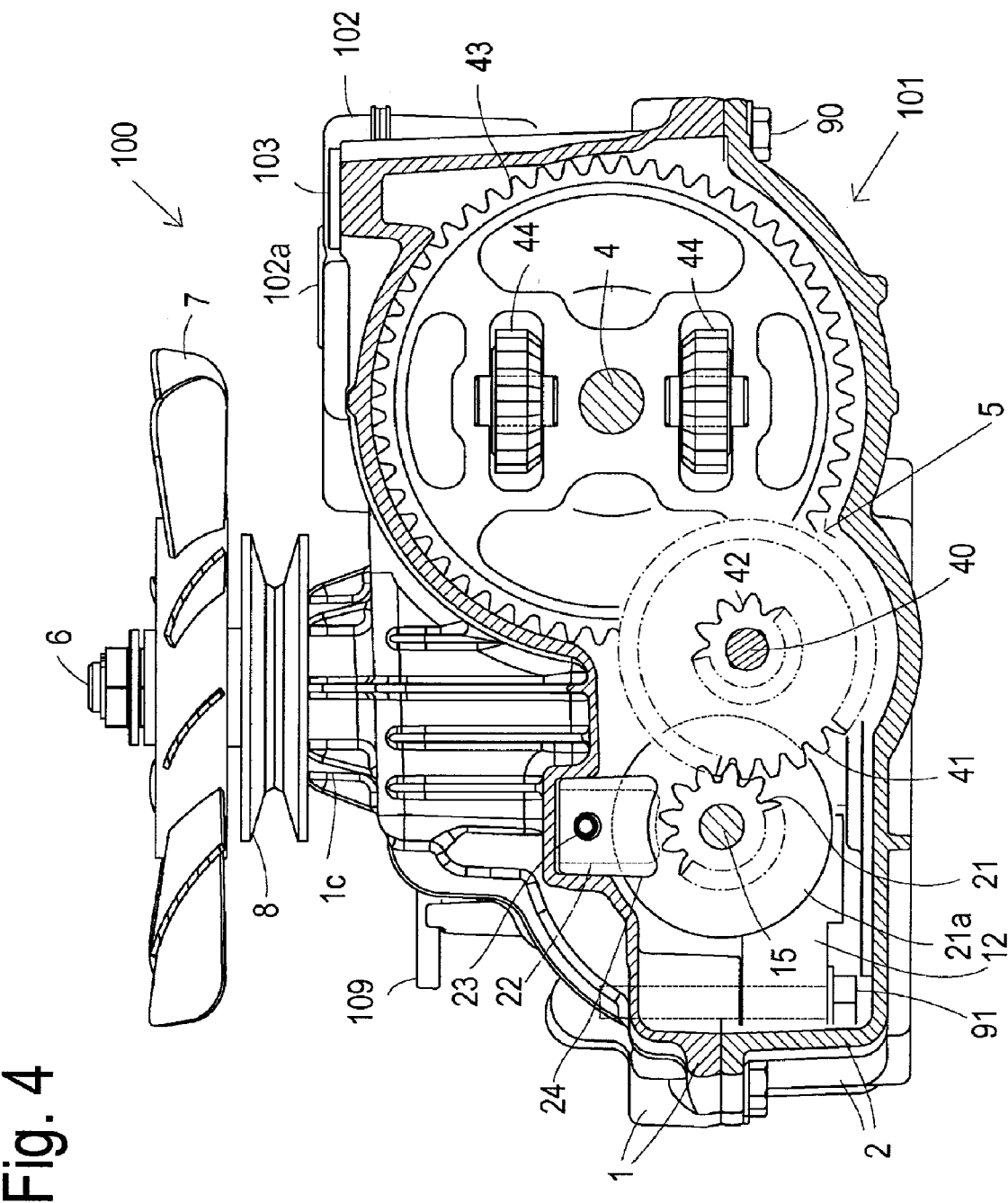
FIG. 4 is a cross sectional view taken along IV-IV line of FIG. 2.
Figure 5:
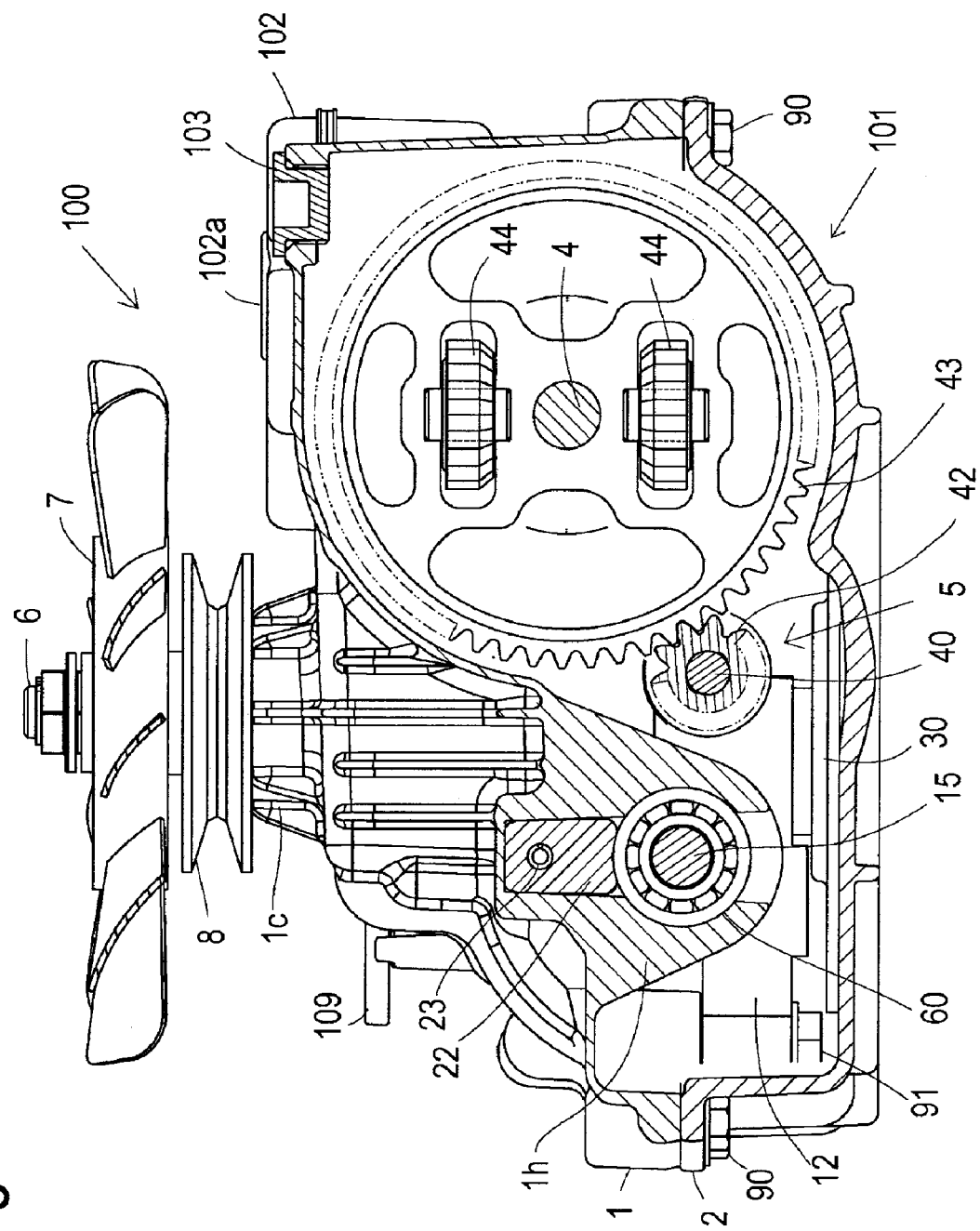
FIG. 5 is a cross sectional view taken along V-V line of FIG. 2.

A laterally horizontal neutral-positioning shaft 107 is disposed in front of pump control shaft 105, and fixed to first housing member 1. Referring to FIG. 3, neutral-positioning shaft 107 is an eccentric collar, in which a penetrating hole is bored eccentrically to the center axis thereof. A bolt 108 is screwed into a wall of first housing member 1 through the hole of neutral-positioning shaft 107 so as to fasten neutral-positioning shaft 107 to first housing member 1. When pump control arm 104 is disposed at the neutral position, spring-contact portion 104a of pump control arm 104 and neutral-positioning shaft 107 are compressed between the end portions of spring 106. When pump control arm 104 is rotated from the neutral position, one end portion of spring 106 is pushed by spring-contact portion 104a so as to move away from the other end portion of spring 106 retained by neutral-positioning shaft 107, thereby causing a biasing force of spring 106 for returning pump control arm 104 to the neutral position.

When the neutral position of pump control arm 104 is adjusted, bolt 108 is unfastened from first housing member 1, and neutral-positioning shaft 107 is rotated around bolt 108 so as to adjust the position of spring-contact portion 104a to be compressed by the end portions of spring 106. After the adjustment is completed, bolt 108 is screwed into first housing member 1 so as to fasten neutral-positioning shaft 107 to first housing member 1 again.

An internal structure of IHT 100 will be described with reference to FIGS. 3 to 16. Referring to FIG. 3, in housing 101, deceleration drive (gear) train 5 is extended fore-and-aft in housing 101 between axles 4 and motor shaft 15, and HST 3 is disposed on one lateral side (left side) of deceleration gear train 5 and in front of one (left) axle 4.

Figure 6:
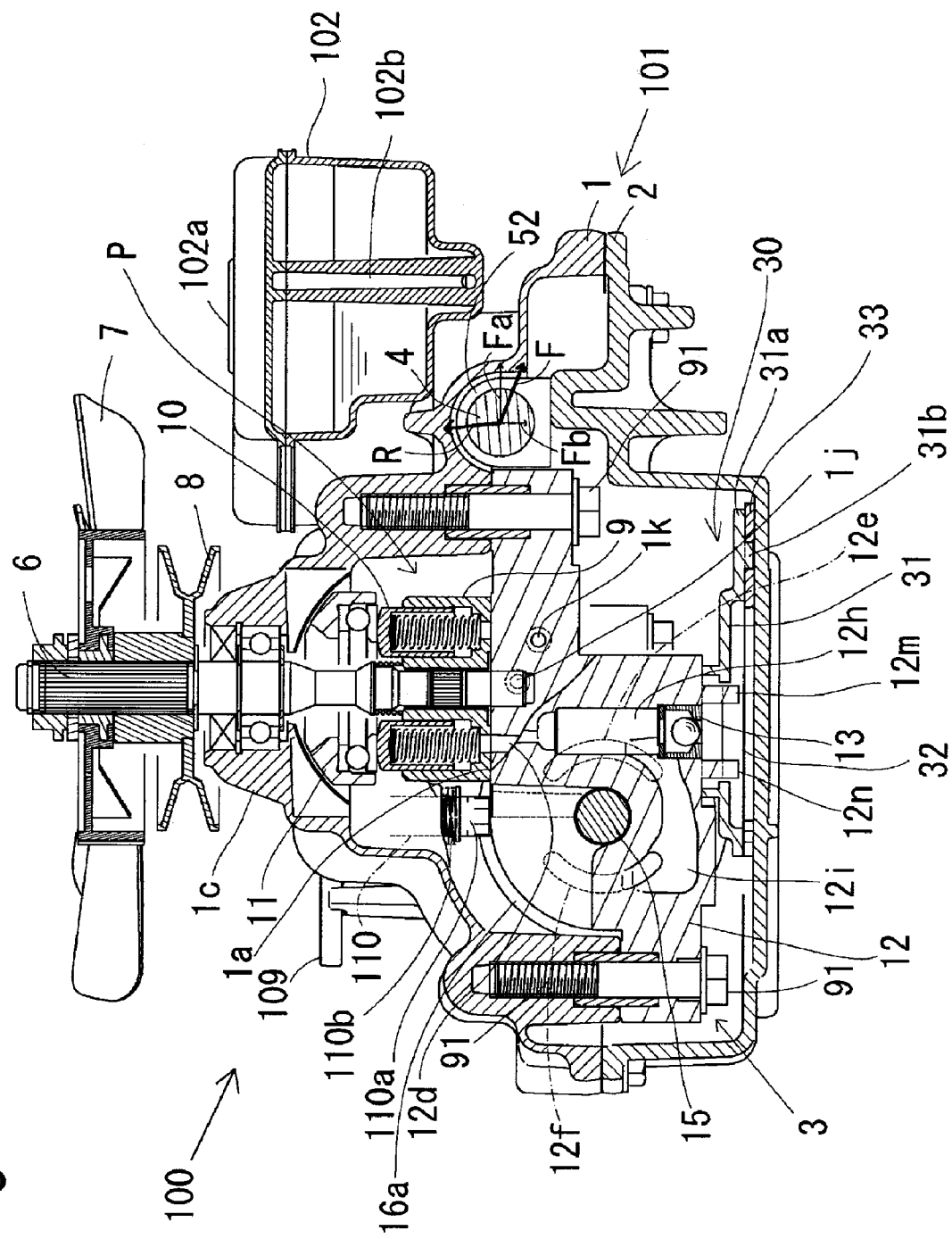
FIG. 6 is a cross sectional view taken along VI-VI line of FIG. 2
Figure 15:
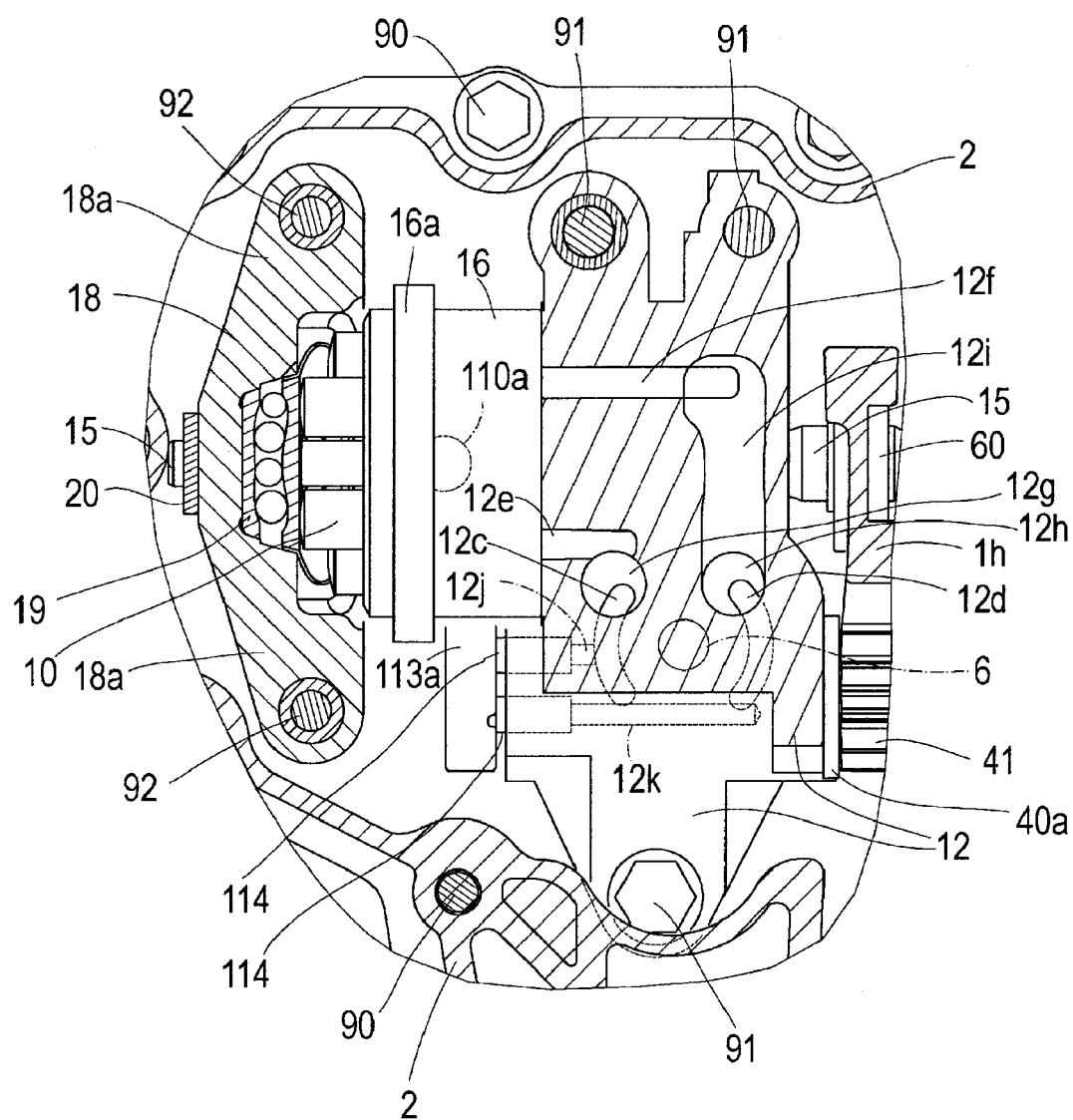
FIG. 15 is a fragmentary sectional bottom view of the IHT showing a center section with a motor cylinder block therein.
Figure 16:
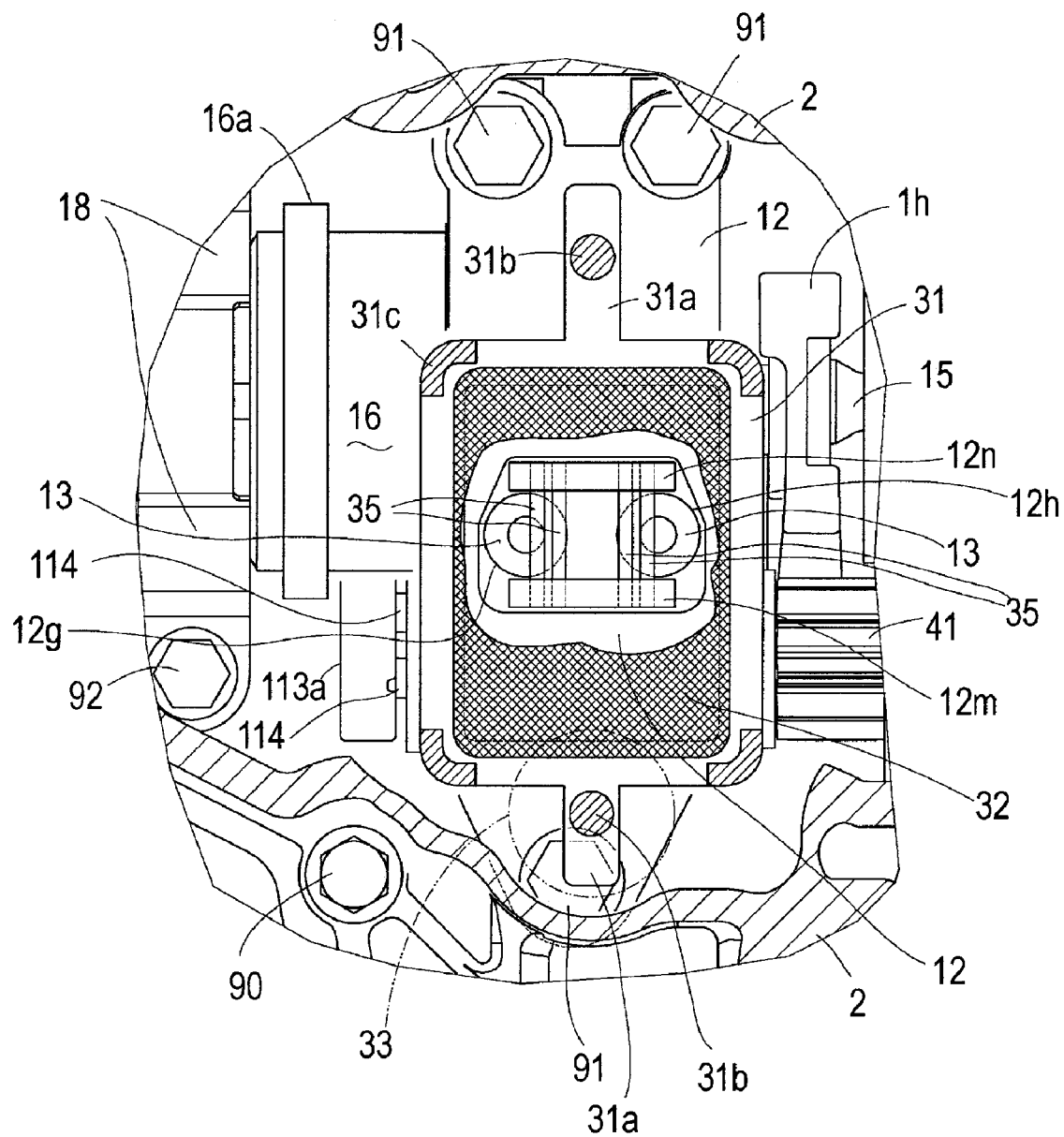
FIG. 16 is a fragmentary sectional plan view of the IHT showing a filter unit therein.

A structure of HST 3 will be described with reference to FIGS. 3, 6, 8 to 12, 15 and 16. HST 3 includes a center section 12. As shown in FIGS. 6, 15 and others, center section 12 is formed a rear end portion thereof and left and right front end portions thereof with respective bolt holes, and bolts 91 are screwed into walls of first housing member 1 through the respective bolt holes of center section 12 so as to fasten center section 12 to upper housing member 1, thereby supporting center section 12 by first housing member 1. The screwing of bolts 91 is performed in the above-mentioned installation of HST 3 into overturned first housing member 1.

As shown in FIGS. 3, 6, 8 and 10, a horizontal pump mounting surface 12a is formed on the top of a rear portion of center section 12. A pump shaft hole is opened upward at the center of pump mounting surface 12a, and vertical pump shaft 6 is rotatably fitted at a bottom portion thereof into the pump shaft hole. A pump cylinder block 9 is relatively unrotatably fitted on pump shaft 6, and is slidably rotatably fitted onto pump mounting surface 12a. Pistons 10 are reciprocally slidably fitted into pump cylinder block 9. A movable swash plate 11 is slidably rotatably supported by first housing member 1 immediately below a bearing disposed in pump shaft bearing portion 1c. Top ends of pistons 10 abut against swash plate 11. Pump shaft 6 is extended upward from pump cylinder block 9, freely rotatably penetrates swash plate 11, and projects upward from the top of pump shaft bearing portion 1c so as to be fixedly provided thereon with cooling fan 7 and input pulley 8, as mentioned above. In this way, variable displacement axial piston type hydraulic pump P is constituted.

As shown in FIGS. 3, 8, 9 and 10, in housing 101, pump control shaft 105 is disposed on one lateral side (left side) of swash plate 11, and an inner control arm 113 is extended from an inner end of pump control shaft 105 and is pivotally connected to one (left) side end of swash plate 11. In this way, swash plate 11 is rotatable centered on pump control shaft 105 due to rotation of pump control arm 104. The rotation direction and degree of swash plate 11 from the neutral position define the delivery direction and amount of fluid from pump cylinder block 9, so as to define the output rotation direction and speed of motor shaft 15 of hydraulic motor M. Incidentally, neutral valves 114 are fore-and-aft (rearwardly) offset from pump shaft 6 so that rear motor kidney port 12e is disposed just below pump mounting surface 12a.

Inner control arm 113 is formed with a valve plate portion 113a which is extended to face a vertical (left) side surface of center section 12. Center section 12 is provided therein with a pair of neutral valves 114. Neutral valves 114 include respective axially horizontal pistons having respective penetrating orifices. Further, neutral valves 114 include respective springs for biasing the pistons outward. The pistons are pressed against valve plate portion 113a by the spring forces and the hydraulic pressure in center section 12. A pair of grooves 113b opened to the fluid sump in housing 101 are formed in valve plate portion 113a so as to correspond to the respective pistons of neutral valves 114. When inner control arm 113 is disposed adjacent to the proper neutral position thereof, at least one of the orifices of neutral valves 114 is opened to corresponding groove 113b so as to drain fluid from center section 12 to the fluid sump in housing 101, thereby realizing the neutral state of HST 3. Therefore, the neutral zone of HST 3 is expanded so as to prevent jerking of a vehicle on starting and other effects.

As shown in FIGS. 3, 6, 8 to 12 and 15, a vertical motor mounting surface 12b is formed on a vertical (left) side surface of a front portion of center section 12 on the side in the lateral direction toward the pump control mechanism including pump control shaft 105 and inner control arm 113. A laterally horizontal motor shaft hole is bored in the front portion of center section 12 and is opened at the center of motor mounting surface 12b, and horizontal motor shaft 15 is rotatably passed through the motor shaft hole. Motor shaft 15 is radially expanded in the motor shaft hole in center section 12 so as to tightly fit to center section 12, thereby being prevented from radially deviating in center section 12. A left end portion of motor shaft 15 projects leftward from motor mounting surface 12b so as to be relatively unrotatably fitted thereon with motor cylinder block 16. Motor cylinder block 16 is slidably rotatably fitted onto motor mounting surface 12b. Horizontal pistons 17 are reciprocally slidably fitted into motor cylinder block 16. A thrust bearing serving as a fixed swash plate 19 is supported by first housing member 1 through a retainer 18. Horizontal pistons 17 abut at left ends thereof against swash plate 19. Motor shaft 15 is extended leftward from motor cylinder block 16, freely rotatably penetrates swash plate 19 and retainer 18, and is retained on a left side surface of retainer 18 by a thrust metal (C-ring) 20 so as to be prevented from axially (leftward or rightward) escaping. In this way, fixed displacement axial piston type hydraulic motor M is constituted.

Figure 7:
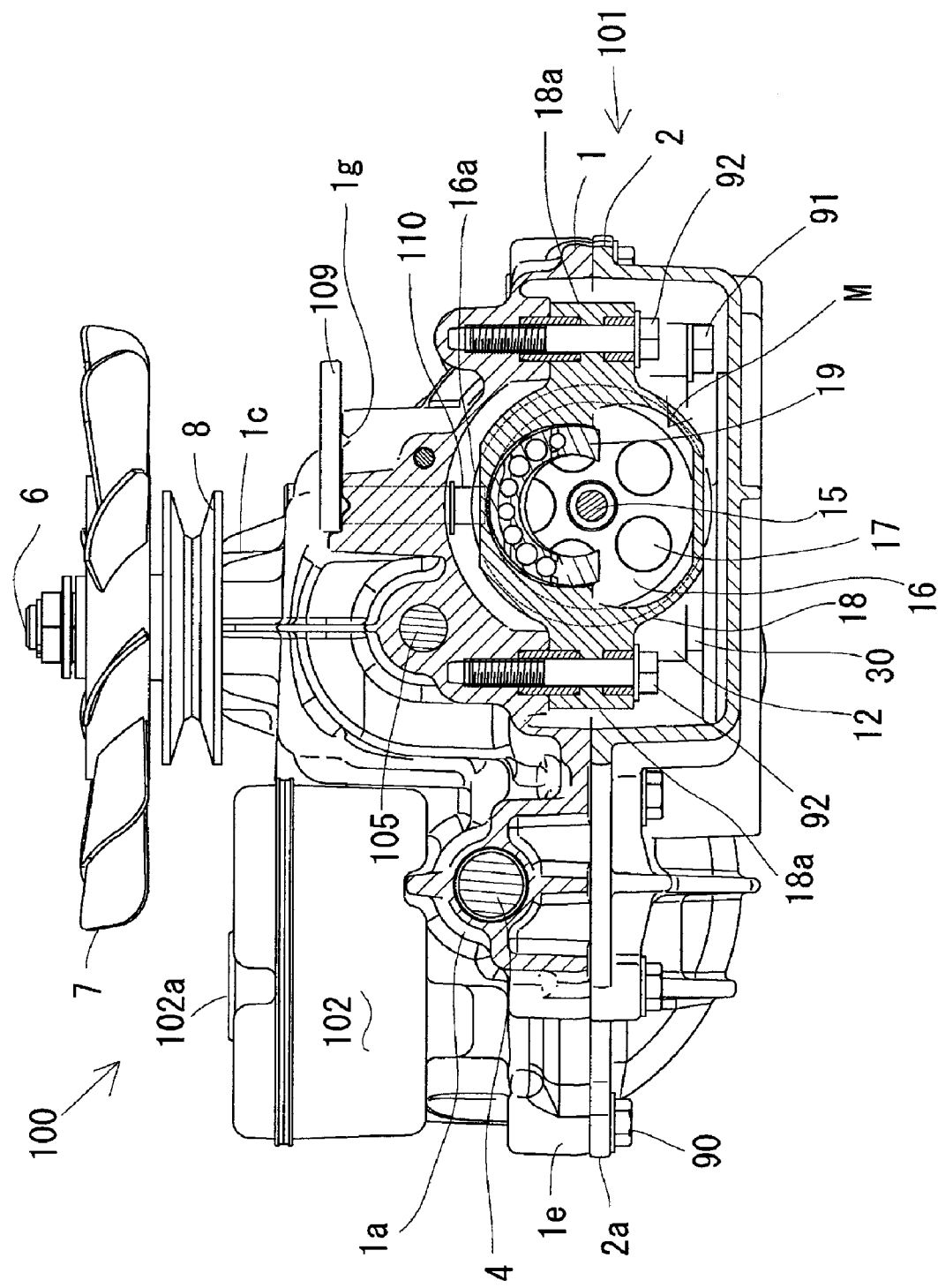
FIG. 7 is a cross sectional view taken along VII-VII line of FIG. 2.
Figure 8:
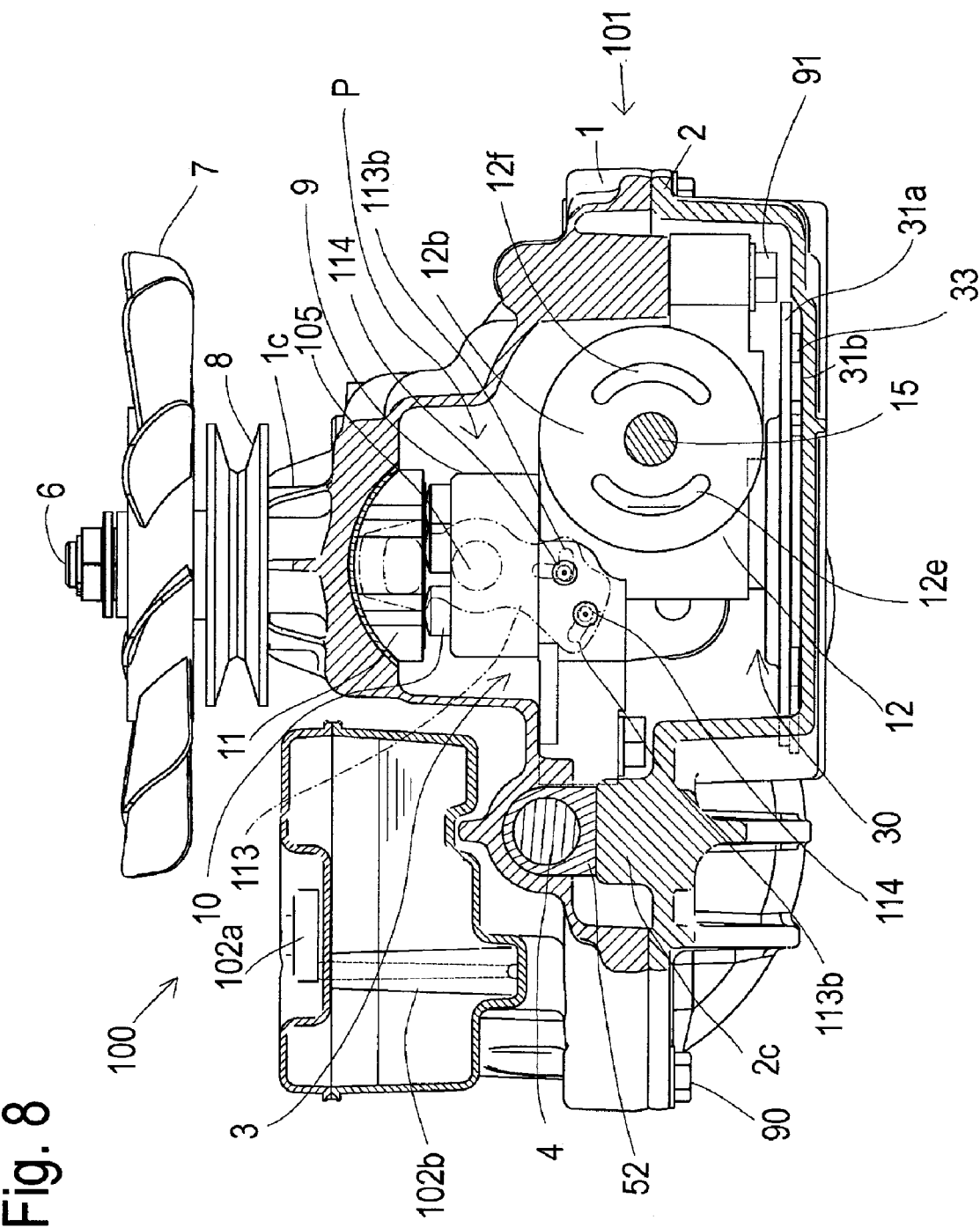
FIG. 8 is a cross sectional view taken along VIII-VIII line of FIG. 2.
Figure 9:
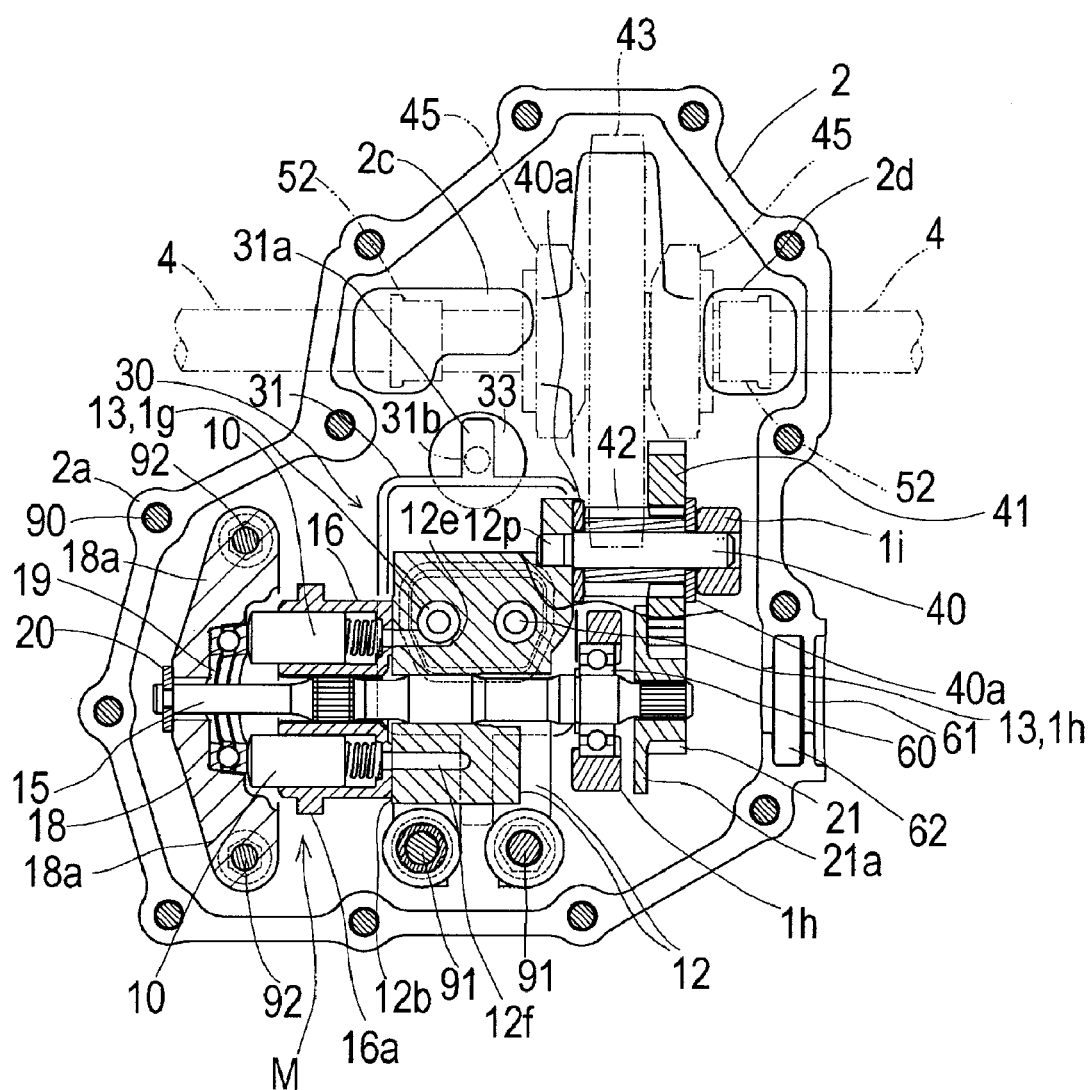
FIG. 9 is a cross sectional view taken along IX-IX line of FIG. 1.

Referring to FIGS. 7, 15 and others, retainer 18 is formed integrally with a pair of front and rear stay portions 18a extended forward and rearward from the vertical middle portion thereof. Stay portions 18a are formed with respective vertical bolt holes through which respective bolts 92 are screwed into a wall of first housing member 1 so that first housing member 1 supports retainer 18 supporting swash plate 19. The screwing of bolts 92 is performed in the above-mentioned installation of HST 3 into overturned first housing member 1.

Figure 12:
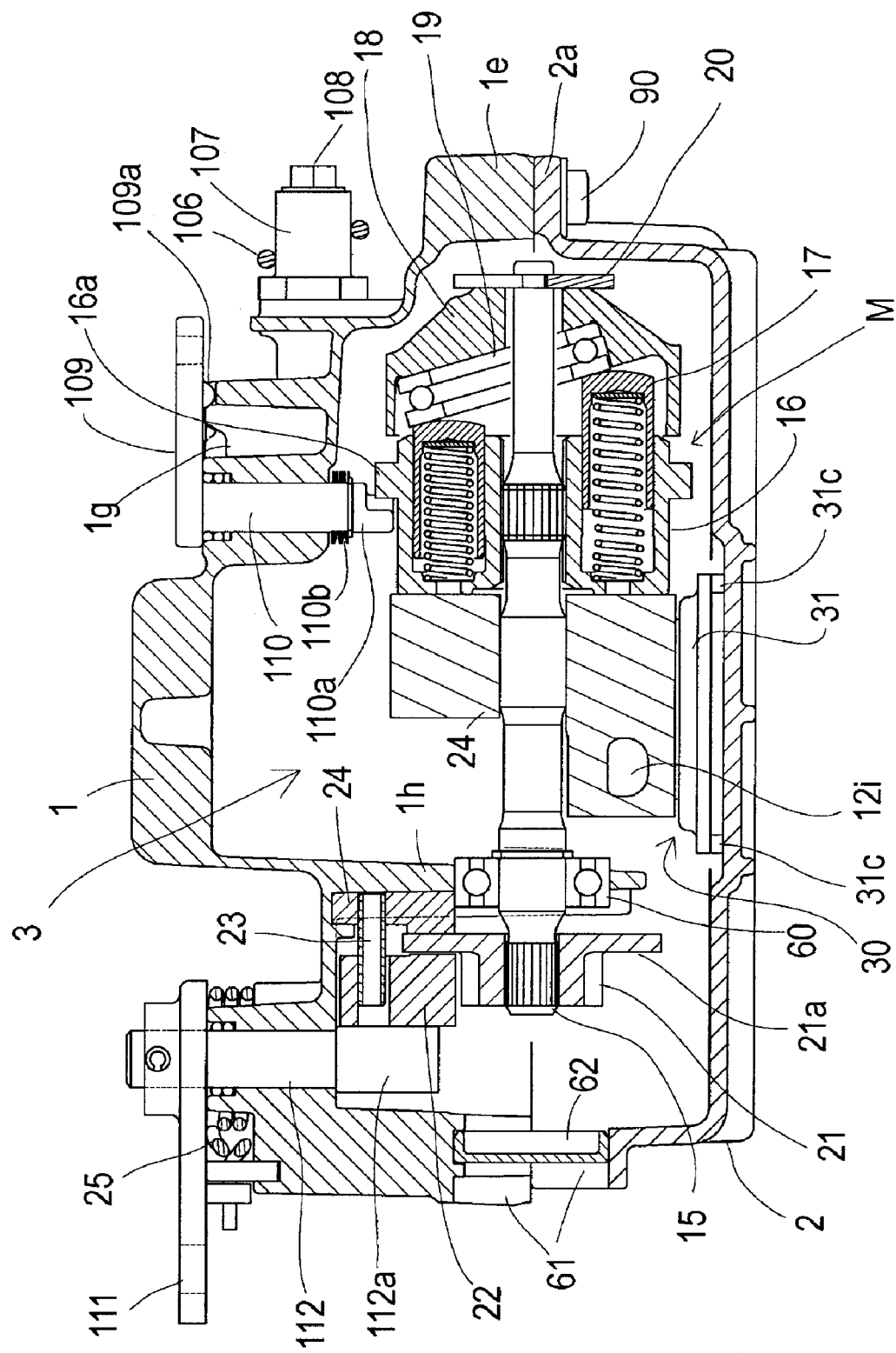
FIG. 12 is a cross sectional view taken along XII-XII line of FIG. 2.

As shown in FIG. 12, motor cylinder block 16 is peripherally formed on the lateral middle portion thereof with a flange 16a. Vertical bypass operation shaft 109 is rotatably supported by the ceiling wall of first housing member 1, and is extended at a bottom end thereof into housing 101. The bottom end portion of bypass operation shaft 109 is formed as a cam portion 109a corresponding to flange 16a of motor cylinder block 16. First housing member 1 is formed with a semicircular projection (when viewed in plan) having a detent groove 1g on the top wall portion adjacent to bypass operation shaft 109. A detent projection 108a projects downward from a lower surface of bypass operation arm 108 disposed immediately above the projection, and is fitted into detent groove 1g movably between a non-operation position and an operation position.

Normally, bypass operation arm 108 with detent projection 108a is disposed at the non-operation position. In this configuration, as shown in FIG. 15, a flat surface of cam portion 109a properly faces flange 16a so as to keep motor cylinder block 19 properly fitted to motor mounting surface 12b. In this regard, in housing 101, a detent spring 109b is provided on bypass operation shaft 109 so as to bias bypass operation arm 109 to the non-operation position. When fluid is required to drain fluid from the fluid passages in center section 12, e.g., for towing a vehicle equipped with IHT 100, bypass operation arm 108 with detent projection 108a is rotated to the operation position. Accordingly, bypass operation shaft 109 is rotated so that the flat surface of cam portion 109a is slanted relative to flange 16a, and an edge of the flat surface of cam portion 109a pushes flange 16a so as to thrust motor cylinder block 16 away from motor mounting surface 12b. Thus, fluid is drained from the gap between motor cylinder block 16 and motor mounting surface 12b to the fluid sump in housing 101.

As shown in FIGS. 3 and 12 and others, motor shaft 15 is extended laterally outward (rightward) from the other side surface of center section 12 opposite to motor mounting surface 12b. First housing member 1 is formed with a motor shaft support portion 1h vertically downward from a ceiling wall thereof adjacent to the right side surface of center section 12. Motor shaft support portion 1h is formed with a penetrating circular hole in which a bearing 60 is fitted. Therefore, motor shaft support portion 1h journals the rightward extended portion of motor shaft 15 through bearing 60. In this way, motor shaft 15 is supported by center section 12 and by motor shaft support portion 1h having bearing 60 serving as a support member adjacent to center section 12. Motor shaft support portion 1h having bearing 60 distributes the load for supporting motor shaft 15 allowing the reduction of the lateral width of the front portion of center section 12 supporting motor shaft 15. The right end of motor shaft 15 is further extended rightward from bearing 60 and is fixedly provided thereon with a motor gear 21 which is one of gears of deceleration gear train 5. Center section 12 is disposed between motor cylinder block 16 and motor gear 21 so as to prevent metallic particles generated by friction of motor gear 21 from influencing motor cylinder block 16.

As shown in FIGS. 3, 12 and others, a brake system is configured in housing 101 adjacent to motor gear 21. In this regard, motor gear 21 is flanged at an end thereof (toward center section 12) to form a brake plate 21a. A brake shoe 24 is disposed between motor shaft support portion 1h and brake plate 21a. Vertical brake shaft 112 is rotatably supported by the ceiling wall of first housing member 1, and is extended at a bottom portion thereof into housing 101. The bottom portion of brake shaft 112 is formed as a cam portion 112a. A brake actuator 22 is disposed between cam portion 112a of brake shaft 112 and brake plate 21a. A horizontal slide guide pin 23 relatively slidably passes brake actuator 22 and brake shoe 24, so as to hang brake actuator 22 in first housing member 1, and to guide the slide of brake actuator 22.

A detent mechanism including a detent spring 25 is configured between brake arm 111 and the top portion of first housing member 1 so as to retain brake arm 111 at either a brake-release position or a braking position. Detent spring 25 biases brake arm 111 toward the brake-release position. Normally, brake arm 111 is disposed at the brake-release position. At this time, as shown in FIG. 15, a flat surface of cam portion 112a properly faces brake actuator 22 so as to keep brake plate 21a separated from brake actuator 22 and brake shoe 24. When brake arm 111 is rotated to the breaking position according to operation of the brake operation device, brake shaft 112 is rotated so that the flat surface of cam portion 112a is slanted relative to brake actuator 22, and an edge of the flat surface of cam portion 112a pushes brake actuator 22 so as to press brake plate 21a between brake actuator 22 and brake shoe 24, thereby braking motor shaft 15 and axles 4 drivingly connected to motor shaft 15 through deceleration gear train 5. The fore-and-aft center portion of brake actuator 22 is adapted to be pressed against cam plate portion 112a so as to receive a constant pressure whether brake shaft 112 is rotated leftward or rightward. Therefore, a constant braking force can be ensured regardless of whether the braking position is determined clockwise or counterclockwise from the brake-release position.

Incidentally, as shown in FIG. 12 and others, an opening 61 is provided between first and second housing members 1 and 2 on the rightward extension line from the right end of motor shaft 21, and is closed by a seal cap 62. Opening 61 is used for drilling the circular hole for fitting bearing 60 into motor shaft support portion 1h. In this regard, IHT 100 can be provided with an external brake system replacing the illustrated brake system disposed in housing 101. In this case, an alternative motor shaft which is longer than illustrated motor shaft 15 is extended through opening 61 opened by removing seal cap 62, so as to be provided with the external brake system on an outer end portion thereof outside housing 101. Further alternatively, a rotary speed sensor may be mounted on an outside portion of housing 101 adjacent to the outer end portion of the alternative long motor shaft so as to detect the rotary speed of the long motor shaft. The outer portion of the long motor shaft projecting outward from opening 61 may serve as a PTO shaft.

Referring to FIGS. 3, 6, 8 to 12, 15 and 16, a pair of fluid passages are formed in center section 12 so as to fluidly connect pump cylinder block 9 and motor cylinder block 16 to each other. In this regard, as show in FIG. 3 and others, a pair of left and right pump kidney ports 12c and 12d are opened at pump mounting surface 12a, and as shown in FIG. 6, a pair of rear and front motor kidney ports 12e and 12f are opened at motor mounting surface 12b. Left and right pump kidney ports 12c and 12d have respective front ends disposed at the same position in the fore-and-aft direction of IHT 100, and have respective rear ends disposed at the same position in the fore-and-aft direction of IHT 100. Rear and front motor kidney ports 12e and 12f are leveled at respective top ends thereof, and leveled at respective bottom ends thereof.

Referring to FIGS. 6, 9 to 11 and 15, the inner fluid passage structure of center section 12 will now be described. Center section 12 is bored therein with a pair of left and right vertical fluid holes 12g and 12h aligned in the lateral direction. Left fluid hole 12g is joined at the top end portion thereof to left pump kidney port 12c, and is joined at the vertically intermediate portion thereof to rear motor kidney port 12e, so as to constitute one of the pair of fluid passages interposed between pump and motor cylinder blocks 9 and 16. Right fluid hole 12h is joined at the top end portion thereof to right pump kidney port 12d, and is joined at the vertically intermediate portion thereof to front motor kidney port 12f, so as to constitute the other of the pair of fluid passages interposed between pump and motor cylinder blocks 9 and 16.

Fluid hole 12i is required to be formed in center section 12 so as to connect front motor kidney port 12f and right pump kidney port 12d to each other because kidney ports 12f and 12d are distant from each other in the fore-and-aft direction. On the other hand, rear motor kidney port 12e is disposed just below pump mounting surface 12a, i.e., vertically downward of pump mounting surface 12a, so as to be disposed fore-and-aft adjacent to left pump kidney port 12c. Therefore, kidney ports 12e and 12c are connected only through vertical fluid hole 12g without an additional fluid hole formed in center section 12, thereby reducing the manufacturing cost of center section 12. Further, while pump shaft 6 and motor shaft 15 are offset from each other so that axial extension lines of shafts 6 and 15 do not intersect each other, the fore-and-aft distance between hydraulic pump P and motor M is reduced so as to miniaturize HST 3. Further, the rear end of motor mounting surface 12b is disposed rearward from the front end of pump mounting surface 12a so that the rear portion of motor mounting surface 12b and the front portion of pump mounting surface 12a overlap each other in the fore-and-aft direction, thereby shortening center section 12 in that direction.

Figure 10:
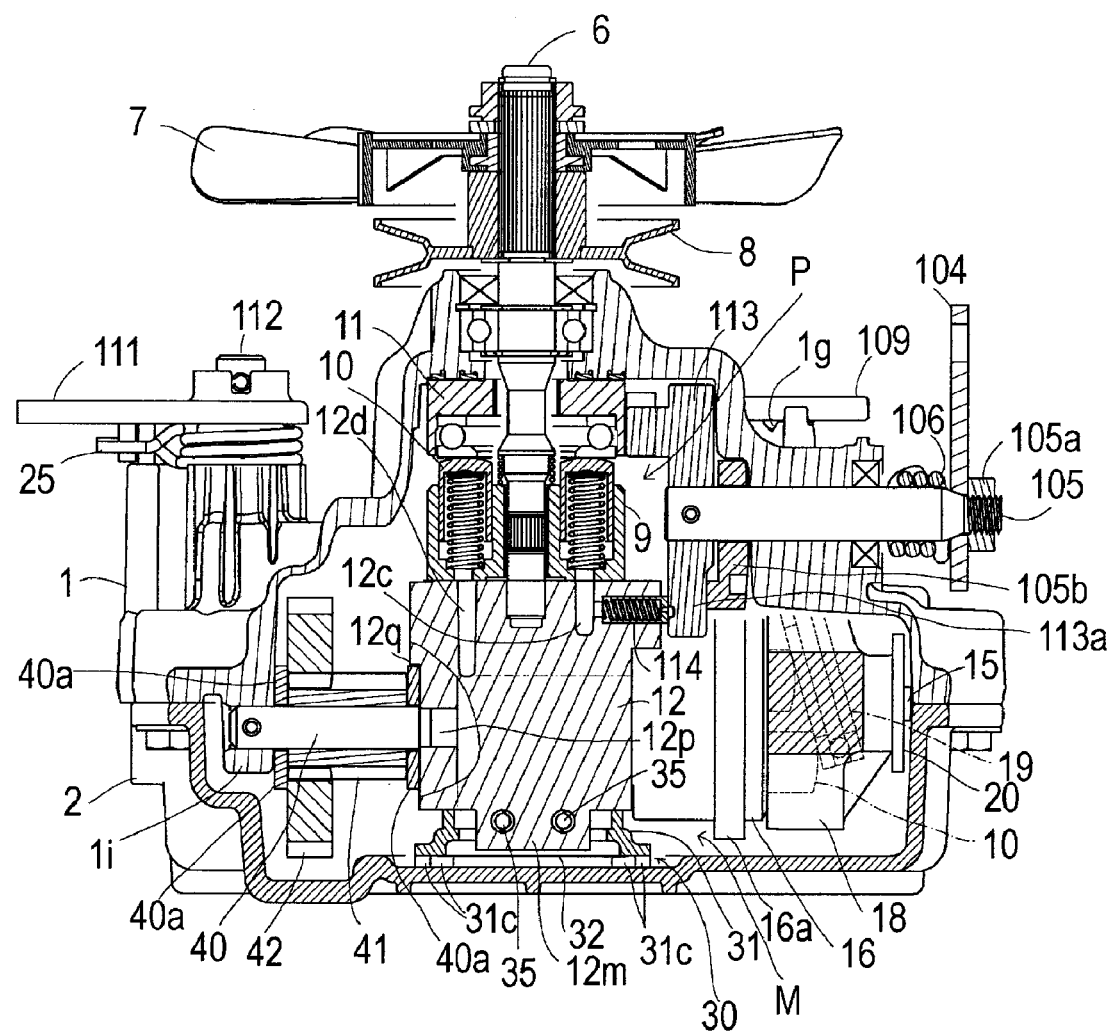
FIG. 10 is a cross sectional view taken along X-X line of FIG. 2.
Figure 11:
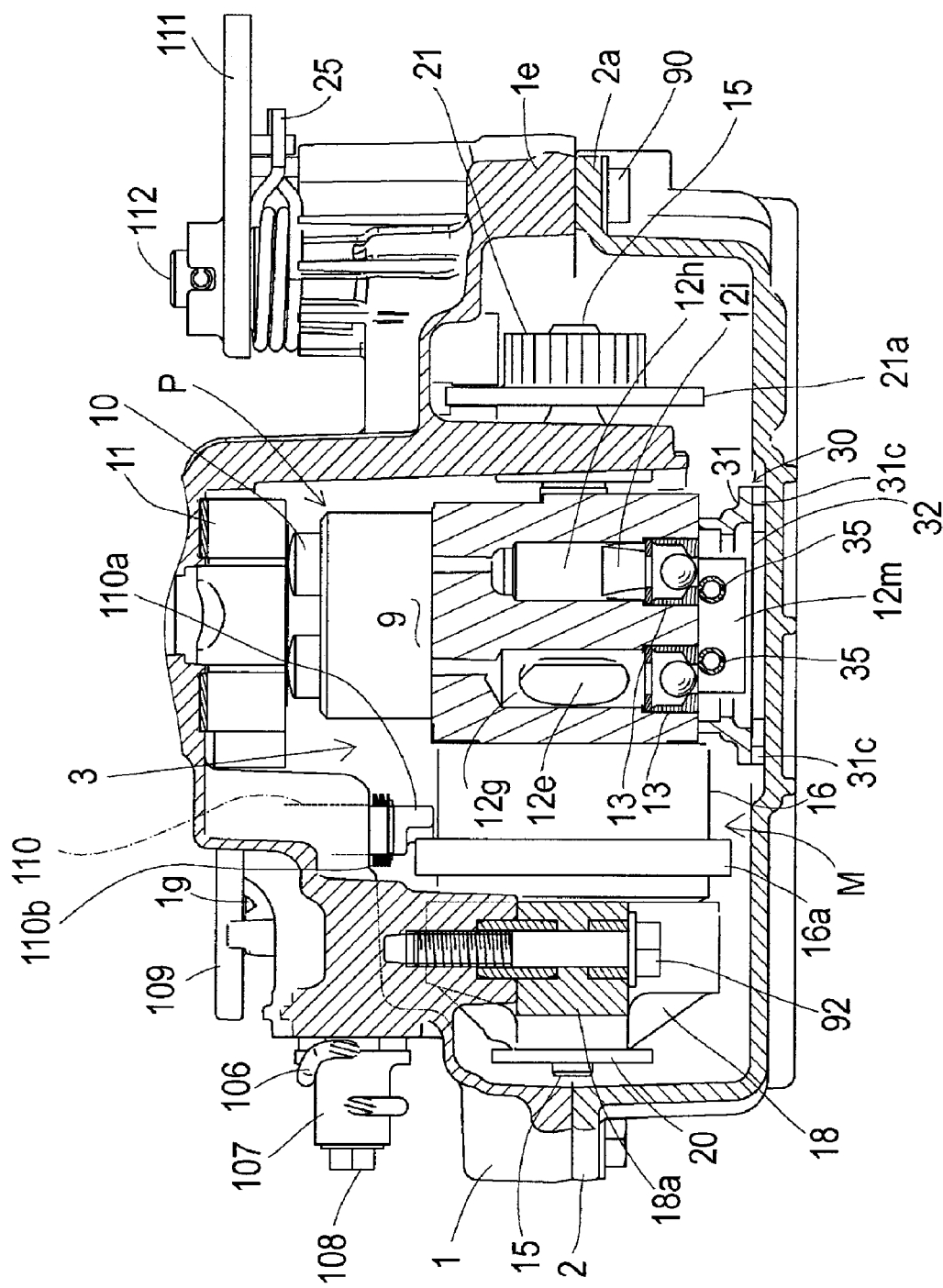
FIG. 11 is a cross sectional view taken along XI-XI line of FIG. 2.

A pair of horizontal valve holes 12j and 12k are bored in center section 12 so as to be extended leftward from portions of respective pump kidney ports 12c and 12d offset from motor shaft 6, and have openings at the left side surface of center section 12 facing valve plate portion 113a of inner control arm 113. The above-mentioned neutral valves 114 are fitted into respective valve holes 12j and 12k through the openings, and are pressed against valve plate portion 113a at outer ends thereof projecting from the openings of valve holes 1j and 1k. As shown in FIG. 10 and others, a spacer 105b is disposed between valve plate portion 113a and a wall of first housing member 1 opposite to neutral valves 114 with respect to valve plate portion 113a so as to slidably support valve plate portion 113a pressed by neutral valves 114. Pump control shaft 105 is relatively rotatably passed through an upper portion of spacer 105b.

Conventional neutral valves fitted in a center section are disposed to fore-and-aft overlap the pump shaft when viewed in side. Therefore, the motor kidney ports are fore-and-aft offset from the pump mounting surface so as to avoid interfering with the neutral valves. However, a considerably long fluid hole is required to be formed in the center section so as to connect the motor kidney ports to the pump kidney ports opened at the pump mounting surface, thereby hindering miniaturization of the center section. According to the present embodiment, neutral valves 114 are fore-and-aft offset from pump shaft 6 so as to ensure a space just below pump mounting surface 12a for forming motor kidney port 12e to be connected to corresponding pump kidney port 12c via only vertical fluid hole 12g, i.e., the shortest fluid passage, as mentioned above.

With respect to the processing manner for forming the fluid passages in center section 12, kidney ports 12c, 12d, 12e and 12f and fluid hole 12i are formed by casting (die casting or lost-form casting), and straight fluid holes 12g and 12h (and valve holes 12j and 12k) are formed by machining (drilling).

Figure 19:
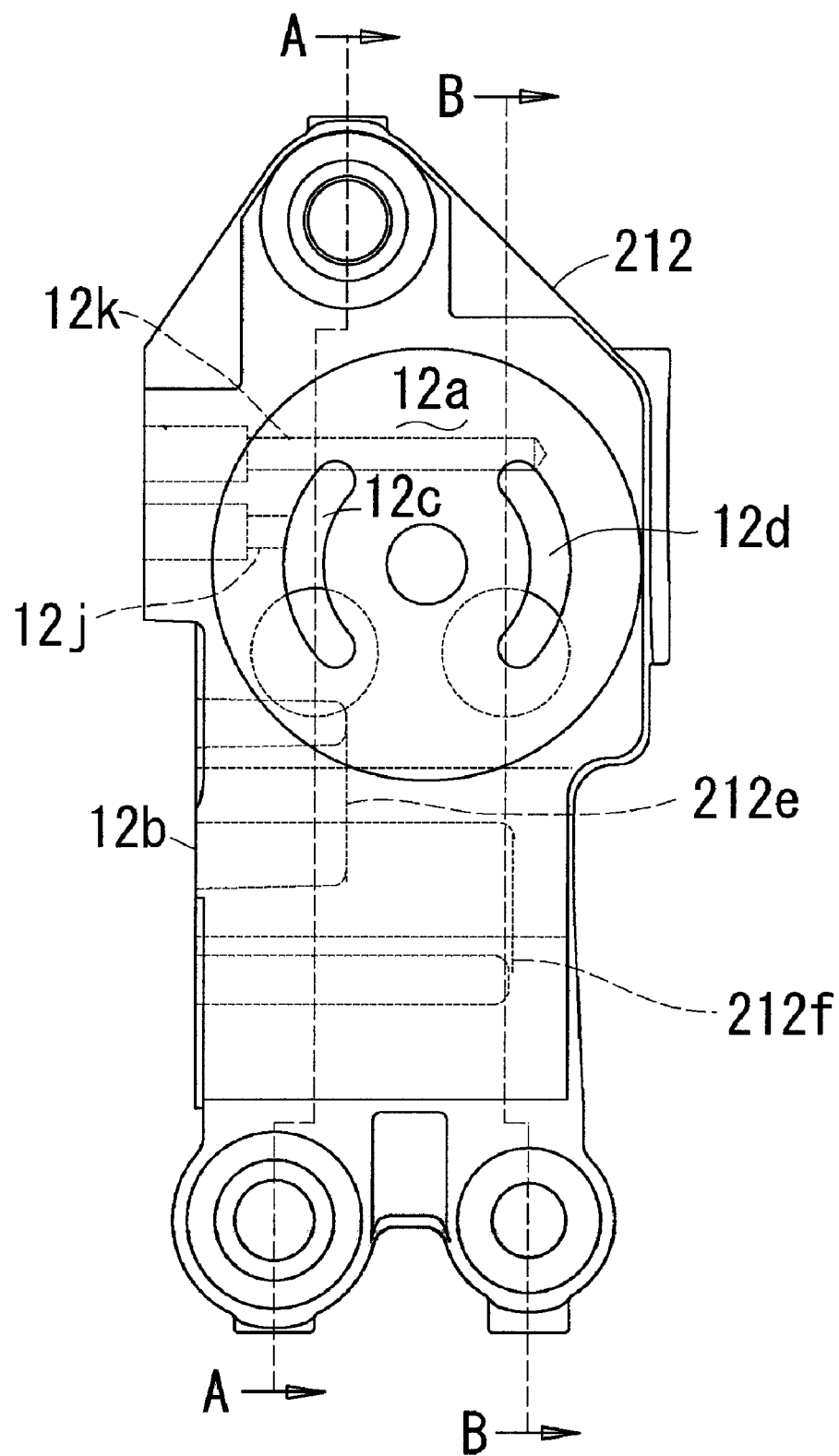
FIG. 19 is a plan view of a center section having an alternative fluid passage structure.

To achieve efficient processing for forming the fluid passages, the arrangement of kidney ports in center section 12 may be changed. An alternative embodiment will now be described with reference to FIGS. 19, 20 and 21. As shown in FIG. 19, an alternative center section 212 has the same arrangements of pump and motor mounting surfaces 12a and 12b and pump kidney ports 12c and 12d opened at pump mounting surface 12a as those of center section 12. However, as understood from FIG. 20 in comparison with FIG. 8, center section 212 has motor kidney ports 212e and 212f which are shifted to some degrees, for example 45 degrees, from the corresponding positions of rear and front motor kidney ports 12e and 12f leveled at the top and bottom ends thereof centered on the center of motor shaft 15. In other words, when viewed facing motor mounting surface 12b (i.e. in the axial direction of motor shaft 15), rear lower motor kidney port 212e and front upper kidney port 212f are symmetric with respect to the shaft hole of center section 212 for passing motor shaft 15, and are aligned downwardly slantwise (for example, at an angle of 45 degrees) from horizontal pump mounting surface 12a. Further, when viewed facing motor mounting surface 12b, the pair of motor kidney ports 212e and 212f are aligned on a line connecting the center of motor mounting surface 12b to pump mounting surface 12a, and the line is diagonal with respect to pump mounting surface 12a (neither horizontal nor vertical).

In center section 212, vertical fluid holes 12g and 12h are bored by machining (drilling) so as to have their neighboring bottom openings at the bottom surface of center section 212, and are joined at the top ends thereof to the front ends of respective pump kidney ports 12c and 12d, similar to those of center section 12. Rear lower motor kidney port 212e is joined at the rear top end thereof to fluid hole 12g. To connect front upper motor kidney port 212f to fluid hole 12h, a fore-and-aft horizontal fluid hole 212i is bored in center section 212 by machining (drilling). Fluid hole 212i is joined at a rear end thereof to the top end of vertical fluid hole 12h, and joined at a fore-and-aft intermediate portion thereof to a rear upper end of motor kidney port 212f. A plug 213 plugs the front end opening of fluid hole 212i, and is pressed at the outer end thereof against a wall of first housing member 1.

In this way, especially, with respect to the fluid passage structure between kidney ports 12d and 212f, fluid holes 12h and 212i formed by machining are joined to each other into an L-like shape. Therefore, when one of the fluid holes is going to be drilled after the drilling of the other, center section 212 can be easily rotated to a set position, thereby efficiently forming the fluid passage.

Figure 20:
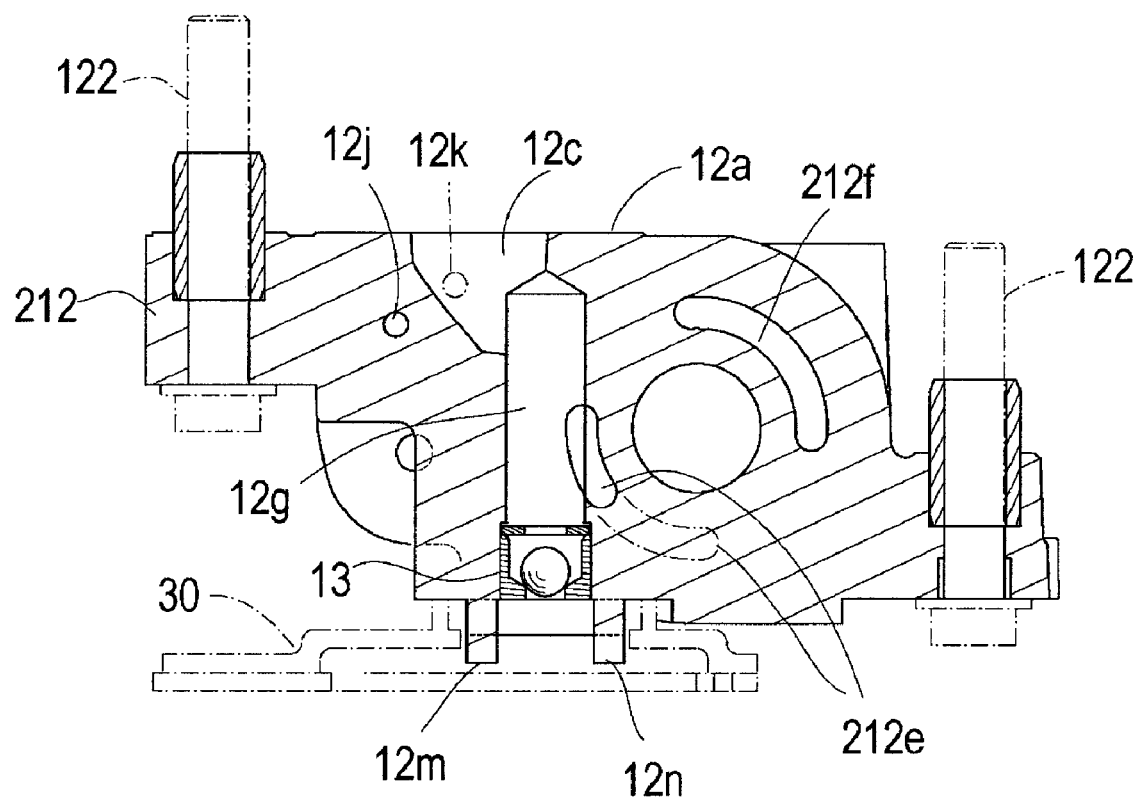
FIG. 20 is a cross sectional view of the center section taken along A-A line of FIG. 19 according to a first embodiment.
Figure 21:
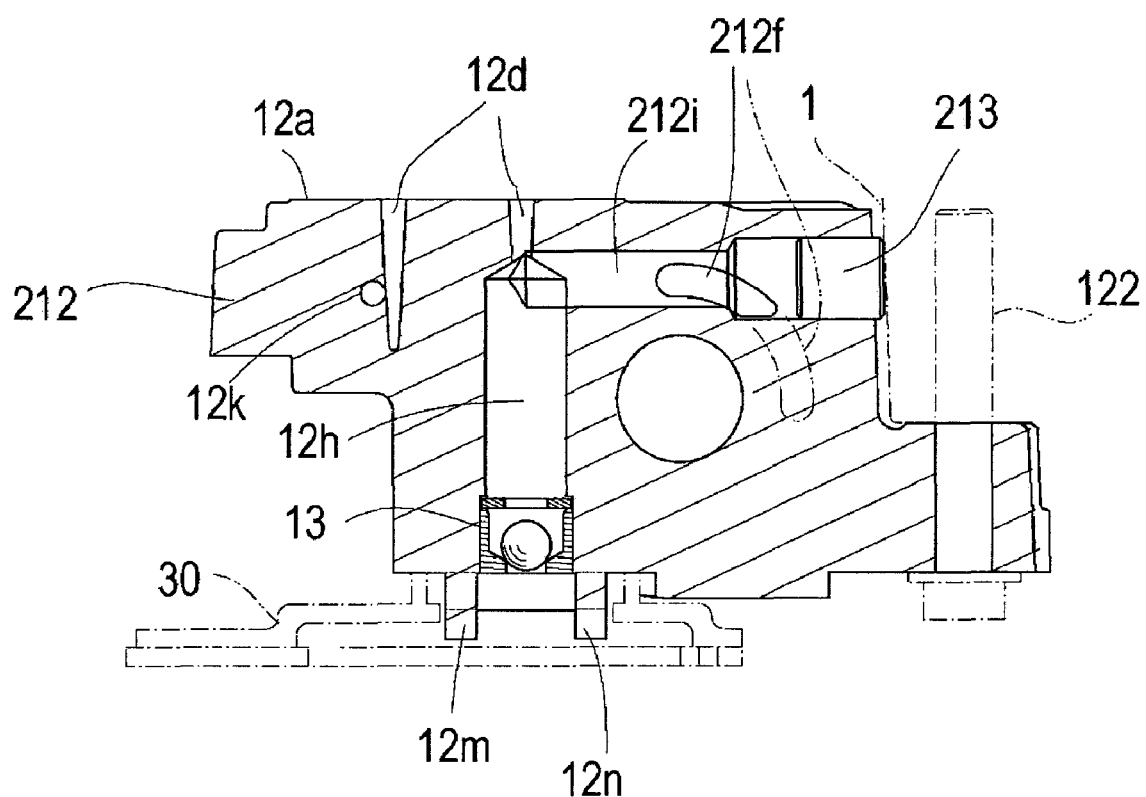
FIG. 21 is a cross sectional view of the center section taken along B-B line of FIG. 19 according to the first embodiment.
Figure 22:
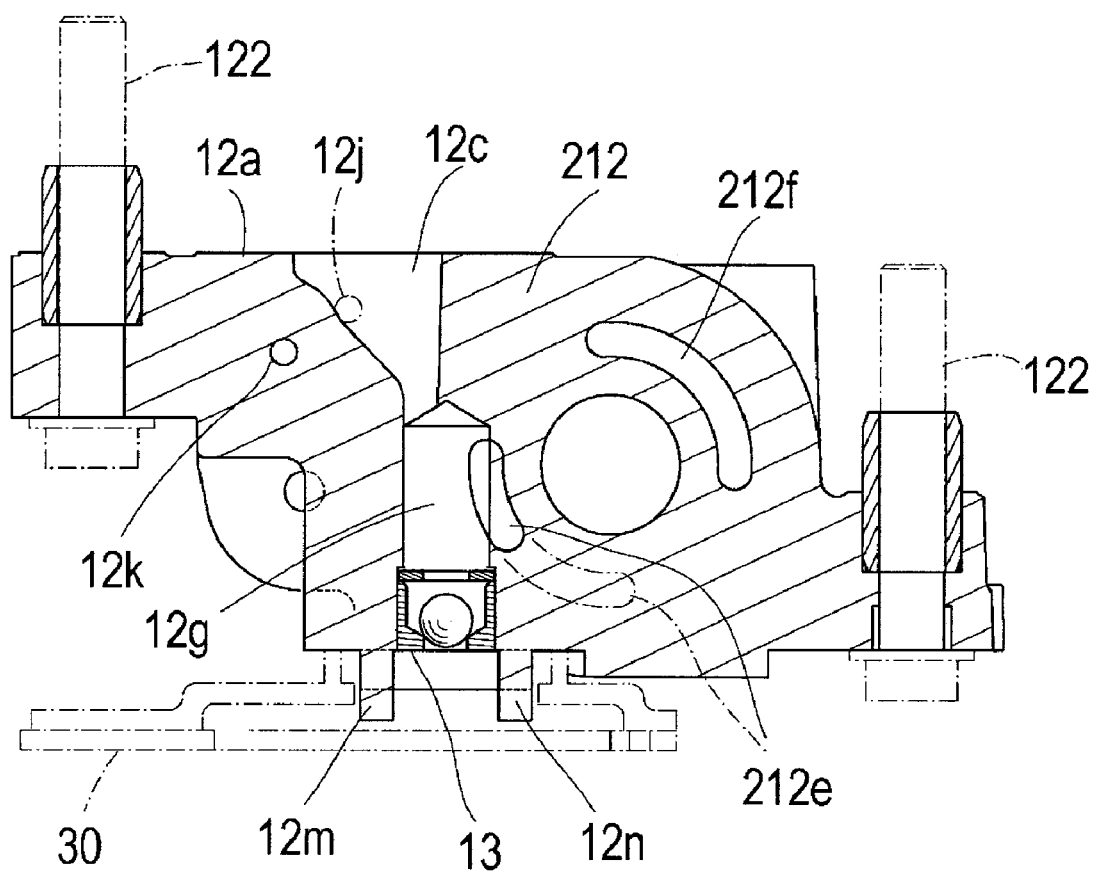
FIG. 22 is a cross sectional view of the center section taken along A-A line of FIG. 19 according to a second embodiment.
Figure 23:
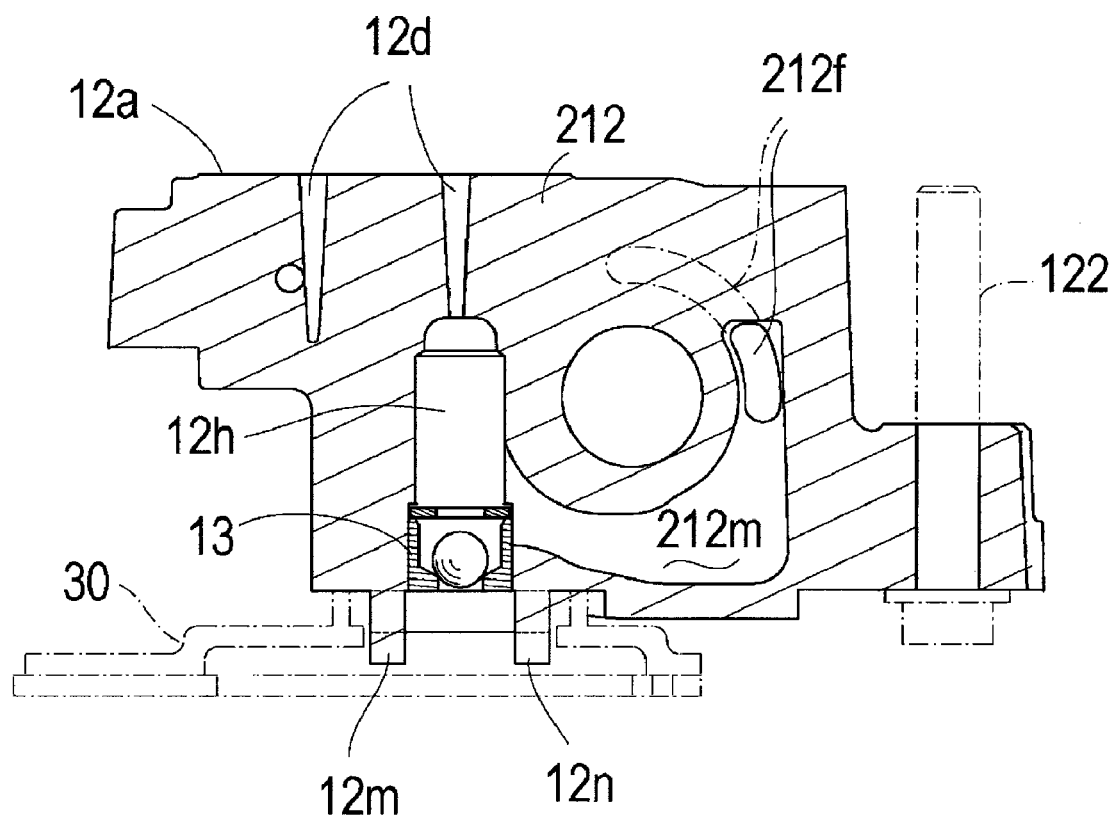
FIG. 23 is a cross sectional view of the center section taken along B-B line of FIG. 19 according to the second embodiment.

Another embodiment of fluid passage structure in center section 212 having motor kidney ports 212e and 212f diagonal (more specifically, at the angle of 45 degrees) with respect to pump mounting surface 12a will be described with reference to FIGS. 19, 22 and 23 (FIG. 19 is shared with the above embodiment of FIGS. 20 and 21). Instead of straight fluid passage 212i formed by machining, a substantially L-shaped fluid hole 212m when viewed in side is formed in center section 212 by casting (such as lost-form casting) so as to connect a lower portion of fluid hole 12h to a front lower end of front upper motor kidney port 212f. Incidentally, due to the diagonally shifted motor kidney ports 212e and 212f, in this embodiment, as show in FIGS. 22 and 23, vertical fluid holes 12g and 12h can be shorter than vertical fluid holes 12g and 12h shown in FIGS. 20 and 21. In other words, the diagonal arrangement of motor kidney ports 212e and 212f is advantageous for shortening vertical fluid holes 12g and 12h. The remaining structure is similar to that shown in FIGS. 20 and 21.

The structure of HST 3 in IHT 100 shown in FIGS. 1 to 18 is now further described. Referring to FIGS. 6, 8 to 11 and 16, bottom ends of fluid holes 12g and 12h are opened at the bottom surface of center section 12, and a pair of charge check valves 13 are fitted into the bottom openings of respective fluid holes 12g and 12h. Each charge check valve 13 is configured so that a valve ball is disposed in a valve casing fitted to center section 12. The valve casing has a bottom opening opened to the fluid sump in housing 101, and the valve ball falls by the gravity so as to close the bottom opening of the valve casing. A filter unit 30 is disposed between the bottom surface of center section 12 and a bottom portion of second housing member 2, so as to filter fluid to be charged from the fluid sump in housing 101 to charge check valves 13.

Filter unit 30 includes a filter frame 31 having a horizontally flat bottom which is substantially rectangular when viewed in plan. Filter frame 31 is raised slightly upward from the flat bottom and has a flat top surface which is fluid-tightly fitted to the bottom surface of center section 12 through a seal or through nothing. A filter mesh 32 is fixed to the bottom surface of filter frame 31 so as to cover an opening in filter frame 31. Filter frame 31 is formed integrally with a pair of front and rear stay portions 31a extended horizontally forward and rearward from the bottom thereof, with foot portions 31b projecting downward from respective stay portions 31a, and with foot portions 31c projecting downward from respective four corners of filter frame 31. Foot portions 31b are passed through respective magnet rings 33 for adsorbing metallic impurities in the fluid in housing 101. In housing 101, foot portions 31b provided thereon with respective magnet rings 33 abut against an upper surface of the bottom portion of second housing member 2. Alternatively, only one of front and rear foot portions 31b may be provided thereon with magnet ring 33.

Center section 12 is formed integrally with a pair of rear and front vertical plate portions 12*m* and 12*n* having fluid holes 12*g* and 12*h* therebetween. Plate portions 12*m* and 12*n* are extended downward from the bottom surface of center section 12 and inserted into the opening of filter frame 31 just above filter mesh 32. Horizontal roll pins 35 are disposed between rear and front plate portions 12*m* and 12*n* so as to prevent charge check valves 13 facing filter mesh 32 from falling.

When IHT 100 is manufactured, filter unit 30 with magnet rings 33 is fitted on the top portion (when properly arranged, the bottom portion) of center section 12 before second housing member 2 is joined to overturned first housing member 1 in which the installation of components is completed. By joining second housing member 2 to first housing member 1, foot portions 31*b* and 31*c* naturally abut against second housing member 2.

Deceleration gear train 5, including gears 21, 41, 42 and 43, will be described with reference to FIGS. 3 to 5 and 9 to 11. A laterally horizontal intermediate (counter) shaft 40 is supported rightward of center section 12 behind motor shaft 15. In this regard, a right side of the rear portion of center section 12 having pump mounting surface 12*a* is expanded rightward, and has a rightwardly opened shaft hole 12*p* into which a left end of intermediate shaft 40 is fitted. First housing member 1 is formed integrally with a downwardly extended support wall 1*i* bored by a circular hole. A right end portion of intermediate shaft 40 is inserted into the circular hole of support wall 1*i* so as to be supported by first housing member 1. A pinion 42 is fitted on intermediate shaft 40. As shown in FIG. 10, washers 40*a* are disposed between center section 12 and the left end of pinion 42, and between support wall 1*i* and the right end of pinion 42, respectively. The right side portion of center section 12 is formed with a step 12*q* such as to fit washer 40*a*. Due to the engagement of washer 40*a* to step 12*q*, washer 40*a* is prevented from escaping when intermediate shaft 40 is assembled into housing 101.

A gear 41 is fixed on pinion 42 and meshes with motor gear 21 therebefore. Pinion 42 meshes with a bull gear 43 therebehind. Proximal ends of left and right axles 4 are relatively rotatably fitted into a laterally axial center hole of bull gear 43. A pair of symmetric differential pinions 44 are pivoted in bull gear 43 so as to have respective pivot axes in the radial direction of bull gear 43. A pair of left and right differential side gears 45 are fixed on respective axles 4 adjacent to the left and right side surfaces of bull gear 43. Each of differential side gears 45 meshes with both differential pinions 44. In this way, left and right axles 4 are differentially connected to each other.

Figure 14:
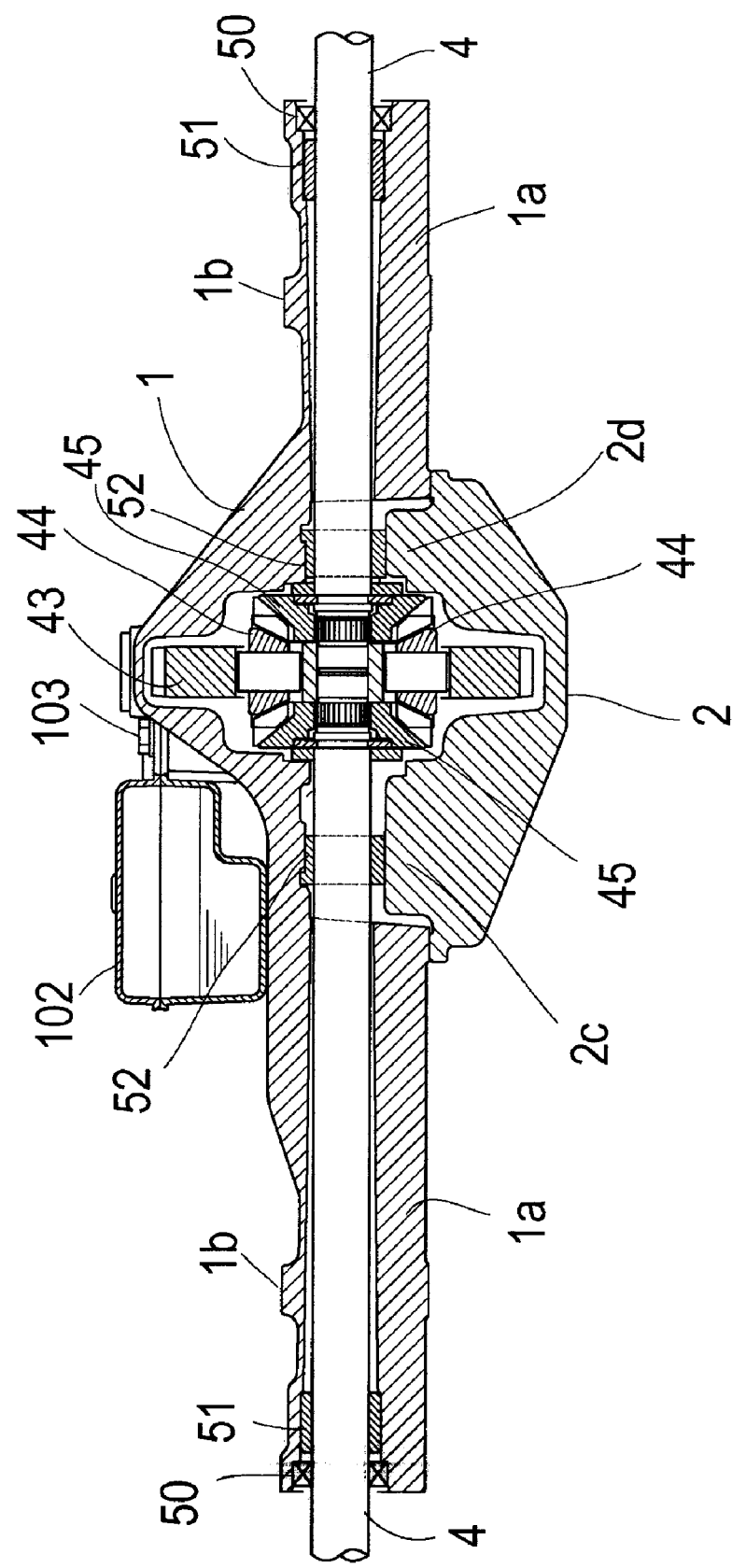
FIG. 14 is a cross sectional view taken along XIV-XIV line of FIG. 2.

A structure for supporting axles 4 will be described with reference to FIGS. 3, 6 and 14. Each of axle housing portions 1*a* of first housing member 1 is formed therethrough with a laterally horizontally extended axle hole for passing corresponding axle 4 therethrough. A fluid seal 50 is fitted between axle 4 and axle housing portion 1*a* in a distal end portion of the axle hole. A bush (collar) 51 is fitted between axle 4 and axle housing portion 1*a* inwardly adjacent to fluid seal 50.

A proximal portion of each axle 4 is relatively rotatably fitted through a supporter 52 disposed laterally inward from each axle housing portion 1*a*. Supporter 52 is formed with a flat bottom surface. Second housing member 2 is formed integrally with a pair of left and right base portions 2*c* and 2*d* having respective flat top surfaces. Supporters 52 are put at the respective bottom surfaces on the respective top surfaces of base portions 2*c* and 2*d*. Therefore, second housing member 2 supports the weight of axles 4.

Supporters 52 are circular-shaped at the top portions thereof so as to fit walls of first housing member 1. Referring to FIG. 6, the shapes of supporters 52 and the corresponding walls of first and second housing members 1 and 2 are designed so that, during the backward rotation of axles 4, a backward rotation centrifugal force R of axles 4 is effectively applied to the walls of first housing member 1 through supporters 52 so as to let second housing member 2 be free from the centrifugal force of rotating axles 4, and that, during the forward rotation of axles 4, horizontal components Fa of forward rotation centrifugal forces F of axles 4 parallel to the horizontal joint surface between first and second housing members 1 and 2 (i.e., perpendicular to bolts 90) are effectively applied through supporters 52 to the walls of first housing member 1, and meanwhile, only vertical components Fb of forward rotation centrifugal forces F of axles 4 perpendicular to the horizontal joint surface between first and second housing members 1 and 2 (i.e., parallel to bolts 90) are effectively applied to the walls of second housing member 2. In other words, during rotation of axles 4, second housing member 2 is free from the horizontal component of the centrifugal force of axles 4 parallel to the joint surface between first and second housing members 1 and 2, so as to be prevented from horizontally deviating from first housing member 1. Thus, the material of second housing member 2 is not required to have high strength. Incidentally, while axles 4 are stationary, the weight of axles 4 is applied onto second housing member 2 in the gravity direction, i.e., vertically.

Figure 17:
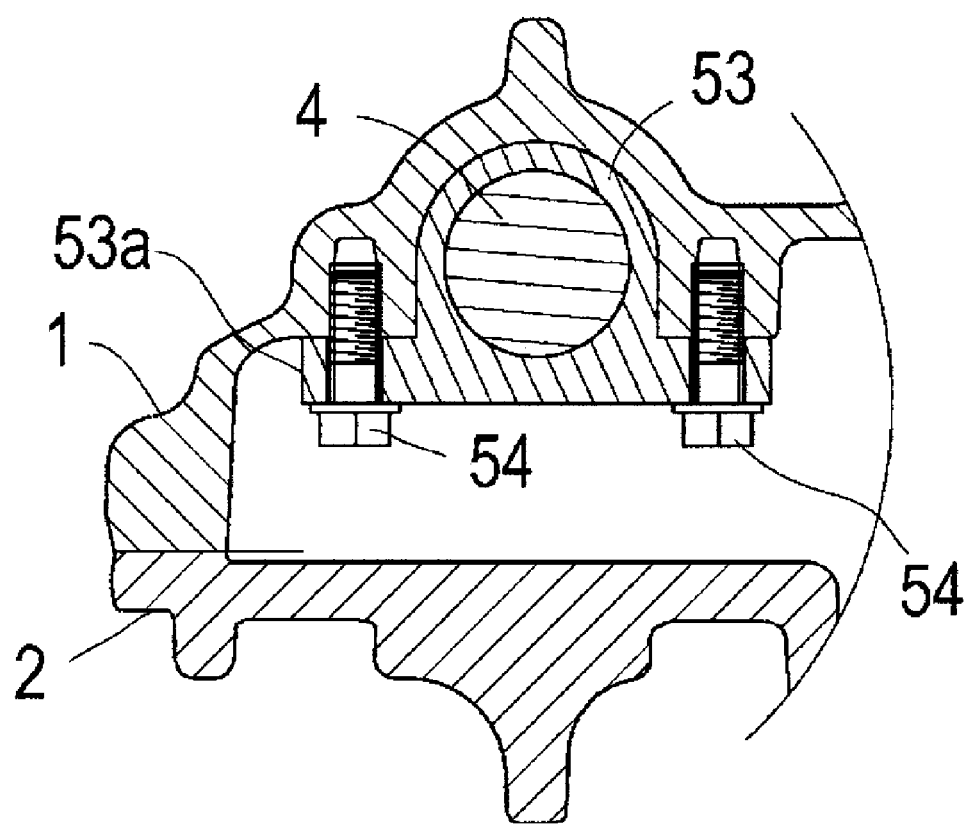
FIG. 17 is a fragmentary sectional view of the IHT employing an alternative axle support structure.

Alternatively, the proximal portions of axles 4 may be supported by first housing member 1 through respective alternative supporters 53 as shown in FIG. 17. In this regard, supporter 53 is formed with a bottom flange 53*a*, which is fastened to first housing member 1 through bolts 54. No portions such as base portions 2*c* and 2*d* are formed on second housing member 2, and the bottom end of supporter 53 is spaced above second housing member 2 so as to be supported by first housing member 1 instead of second housing member 2.

Figure 18A:
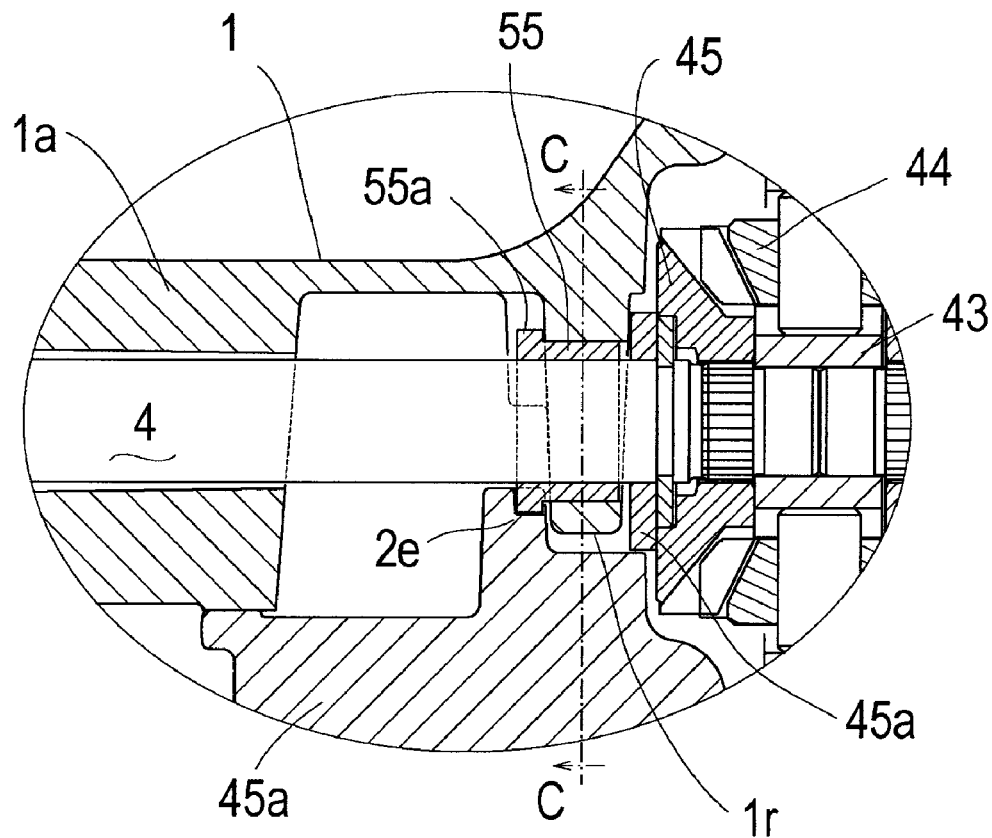
FIG. 18(a) is a fragmentary sectional view of the IHT employing another alternative axle support structure.
Figure 18B:
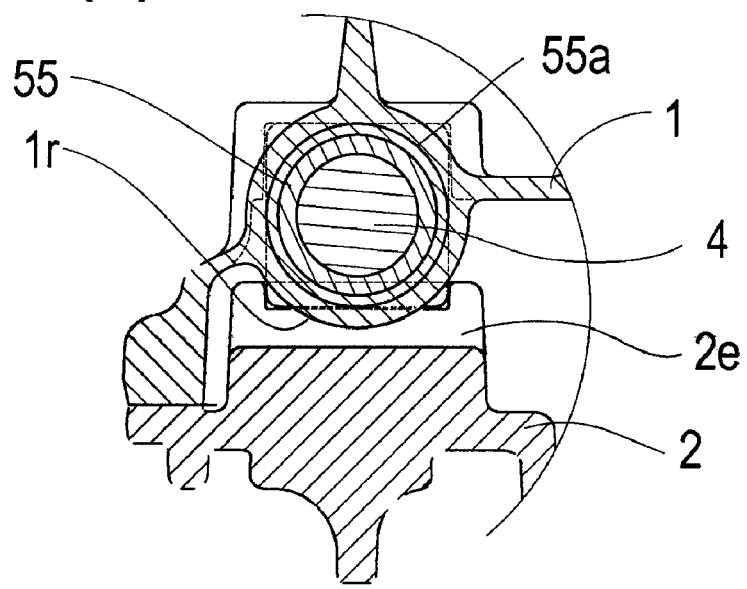
FIG. 18(b) is a cross sectional view of the IHT taken along C-C line of FIG. 18(a) employing the another alternative axle support structure.

Further alternatively, the proximal portions of axles 4 may be supported by first housing member 1 through respective alternative bushes (collars) 55 as shown in FIGS. 18(*a*) and 18(*b*). In this regard, first housing member 1 is formed with a support portion 1*r* extended downward from a ceiling wall of first housing member 1, and axle 4 is passed through a shaft hole formed through support portion 1*r*. A bush 55 is disposed in the shaft hole, and interposed between axle 4 and support portion 1*r*. A washer 45*a* is provided on axle 4 on the outside of the shaft hole toward differential side gear 45 so as to contact differential side gear 45. A distal end portion of bush 55 projects outward from the shaft hole of support portion 1*r* opposite to differential side gear 45, and is formed as a flange 55*a*. Second housing member 2 is formed on a wall thereof with a stepped portion 2*e* corresponding to flange 55*a*. Flange 55*a* is engaged to stepped portion 2*e* so as to prevent bush 55 from escaping.

It is further understood by those skilled in the art that the foregoing description is a preferred embodiment of the disclosed device and that various changes and modifications may be made in the invention without departing from the scope thereof defined by the following claims.

What is claimed is:

1. A hydrostatic transaxle comprising:
 a hydrostatic transmission including first and second hydraulic displacement units fluidly connected to each other, wherein the first hydraulic displacement unit has a pump shaft for receiving power from a prime mover, and wherein the second hydraulic displacement has a motor shaft;

an axle;

a deceleration drive train interposed between the motor shaft and the axle;

a first housing member supporting the hydrostatic transmission and the deceleration drive train, the first housing member having an opening through which the hydrostatic transmission and the deceleration drive train are installed into the first housing member; and a second housing member joined to the first housing member so as to serve as a lid for covering the opening of the first housing member after the hydrostatic transmission and the deceleration drive train are installed in the first housing member so as to be supported by the first housing member, wherein the deceleration drive train includes an intermediate shaft, and wherein, of the first and second housing members, only the first housing member supports the intermediate shaft.

2. The hydrostatic transaxle according to claim 1, the second hydraulic displacement unit including:

a cylinder block engaging with the motor shaft;

a reciprocated axial piston provided in the cylinder block;

a swash plate abutting against a head of the piston; and a retainer for retaining the swash plate, wherein, of the first and second housing members, only the first housing member supports the retainer.

3. The hydrostatic transaxle according to claim 1, wherein, of the first and second housing members, only the first housing member supports the motor shaft.

4. The hydrostatic transaxle according to claim 3, the second hydraulic displacement unit including:

a cylinder block engaging with the motor shaft;

a reciprocated axial piston provided in the cylinder block;

a swash plate abutting against a head of the piston; and a retainer for retaining the swash plate, wherein, of the first and second housing members, only the first housing member supports the retainer.

5. The hydrostatic transaxle according to claim 1, wherein the first and second housing members cooperatively support the axle, so that, during rotation of the axle, the second housing member receives only a component of a centrifugal force of the rotating axle substantially perpendicular to a joint surface between the first and second housing members.

6. The hydrostatic transaxle according to claim 1, wherein, of the first and second housing members, only the first housing member supports the axle.

7. The hydrostatic transaxle according to claim 1, wherein the first and second housing members are joined to each other separably along a joint surface disposed in parallel to a phantom surface including an axis of the axle.

8. The hydrostatic transaxle according to claim 1, further comprising:

a variable displacement hydraulic pump serving as the first hydraulic displacement unit, the hydraulic pump including a pump cylinder block and a pump shaft for receiving power from a prime mover;

a hydraulic motor serving as the second hydraulic displacement unit, the hydraulic pump including a motor cylinder block and a motor shaft;

a center section on which the pump cylinder block and the motor cylinder block are mounted so as to fluidly connect the hydraulic pump and motor to each other, wherein the deceleration drive train includes a motor gear provided on the motor shaft, and wherein the motor cylinder block and the motor gear are disposed opposite to each other with respect to the center section; and a pump control arm for controlling the displacement of the hydraulic pump, wherein the pump control arm and the motor gear are disposed on opposite sides of the center section.

9. The hydrostatic transaxle according to claim 8, further comprising:

a support member disposed adjacent to the center section, wherein the center section and the support member support the motor shaft.

10. A center section comprising:

a pump mounting surface adapted to have a pump cylinder block mounted thereon;

a motor mounting surface adapted to have a motor cylinder block mounted thereon, so that a rotary axis of the pump cylinder block mounted on the pump mounting surface is perpendicular to a rotary axis of the motor cylinder block mounted on the motor mounting surface;

a pair of pump kidney ports opened at the pump mounting surface; and a pair of motor kidney ports opened at the motor mounting surface connected to the respective pump kidney ports; and an axial fluid passage extended parallel to the rotary axis of the pump cylinder block mounted on the pump mounting surface so as to connect one of the pump kidney ports to one of the motor kidney ports.

11. The center section according to claim 10, wherein the center section supports a pump shaft which engages with the pump cylinder block mounted on the pump mounting surface so as to serve as the rotary axis of the pump cylinder block, and wherein the center section supports a motor shaft which engages with the motor cylinder block mounted on the motor mounting surface so as to serve as the rotary axis of the motor cylinder block, so that an extension axial line of the pump shaft does not intersect an extension axial line of the motor shaft.

12. The center section according to claim 10, wherein the motor kidney ports are extended in parallel to the motor shaft so as to intersect the respective pump kidney ports when viewed in parallel to the motor mounting surface perpendicular to the rotary axes of the pump and motor cylinder blocks mounted on the respective pump and motor mounting surfaces.

13. The center section according to claim 12, wherein, when viewed facing the motor mounting surface, the pair of motor kidney ports are aligned on a line connecting the center of the motor mounting surface to the pump mounting surface which is diagonal with respect to the pump mounting surface.

14. The center section according to claim 12, wherein the center section is provided therein with a valve for expanding a neutral zone of a hydraulic pump including the pump cylinder block, and wherein the valve is offset from the pump shaft.

15. The center section according to claim 14, wherein the center section is provided therebelow with a plate-shaped filter facing the valve, and wherein a magnet is provided on an edge of the filter.

16. The center section according to claim 10, further comprising:

another axial fluid passage extended parallel to the rotary axis of the pump cylinder block mounted on the pump mounting surface so as to connect the other of the pump kidney ports to the other of the motor kidney ports.

\* \* \* \* \*